(12) United States Patent
Gopalakrishnan et al.

(10) Patent No.: US 9,295,004 B2
(45) Date of Patent: Mar. 22, 2016

(54) DUTY CYCLING TO REDUCE AVERAGE TRANSMIT POWER

(71) Applicant: AMAZON TECHNOLOGIES, INC., Reno, NV (US)

(72) Inventors: Varadarajan Gopalakrishnan, Cupertino, CA (US); James Samuel Bowen, Cupertino, CA (US); In Chul Hyun, San Jose, CA (US); David Woo, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/331,985

(22) Filed: Jul. 15, 2014

(65) Prior Publication Data

US 2014/0329552 A1    Nov. 6, 2014

Related U.S. Application Data

(62) Division of application No. 12/748,641, filed on Mar. 29, 2010, now Pat. No. 8,792,930.

(60) Provisional application No. 61/297,644, filed on Jan. 22, 2010.

(51) Int. Cl.
| | |
|---|---|
| *H04B 7/00* | (2006.01) |
| *H01Q 11/12* | (2006.01) |
| *H04B 1/04* | (2006.01) |
| *H04W 52/18* | (2009.01) |
| *H04B 1/3827* | (2015.01) |
| *H04W 52/36* | (2009.01) |
| *H01Q 1/24* | (2006.01) |
| *H01Q 21/28* | (2006.01) |
| *H04W 52/22* | (2009.01) |

(52) U.S. Cl.
CPC .............. *H04W 52/18* (2013.01); *H01Q 1/243* (2013.01); *H01Q 1/245* (2013.01); *H01Q 21/28* (2013.01); *H04B 1/3838* (2013.01); *H04W 52/228* (2013.01); *H04W 52/36* (2013.01); *H04W 52/367* (2013.01); *Y02B 60/50* (2013.01)

(58) Field of Classification Search
USPC ............ 455/522, 550.1, 553.1, 556.1, 575.6, 455/117, 127.2
See application file for complete search history.

(56) References Cited

U.S. PATENT DOCUMENTS

| | | | |
|---|---|---|---|
| 6,018,646 | A | 1/2000 | Myllymaki et al. |
| 7,353,001 | B1 | 4/2008 | Ngan |
| 7,511,513 | B2 | 3/2009 | Nevermann |

(Continued)

OTHER PUBLICATIONS

USPTO Office Action for U.S. Appl. No. 12/748,738 mailed Apr. 12, 2012.

(Continued)

*Primary Examiner* — Nguyen Vo

(74) *Attorney, Agent, or Firm* — Lowenstein Sandler LLP

(57) ABSTRACT

A user device receives a command to transmit information at a transmit power level specified by a wireless carrier. The user device determines whether transmitting the information at the specified transmit power level using a first duty cycle will cause the user device to violate a condition. Responsive to determining that transmitting the information at the specified transmit power level using the first duty cycle will cause the user device to violate the condition, the user device determines a new duty cycle that is lower than the first duty cycle, and transmits the information using the new duty cycle.

14 Claims, 24 Drawing Sheets

(56) References Cited

U.S. PATENT DOCUMENTS

| | | | |
|---|---|---|---|
| 7,558,232 B2 * | 7/2009 | Pearl | 370/321 |
| 7,565,447 B2 | 7/2009 | Gellens et al. | |
| 8,571,472 B2 | 10/2013 | Lin et al. | |
| 8,792,930 B1 | 7/2014 | Gopalakrishnan et al. | |
| 2002/0016155 A1 | 2/2002 | Charbonnier | |
| 2002/0081978 A1 * | 6/2002 | Hou et al. | 455/67.1 |
| 2002/0173295 A1 | 11/2002 | Nykanen et al. | |
| 2003/0228875 A1 * | 12/2003 | Alapuranen | 455/522 |
| 2004/0176125 A1 | 9/2004 | Lee | |
| 2005/0113125 A1 | 5/2005 | Kang | |
| 2005/0144294 A1 | 6/2005 | Gellens et al. | |
| 2005/0234676 A1 | 10/2005 | Shibayama | |
| 2006/0153118 A1 | 7/2006 | Bailey | |
| 2006/0203731 A1 | 9/2006 | Tiedemann et al. | |
| 2006/0209803 A1 | 9/2006 | Rajaniemi et al. | |
| 2007/0075965 A1 | 4/2007 | Huppi et al. | |
| 2007/0111681 A1 | 5/2007 | Alberth et al. | |
| 2007/0136372 A1 | 6/2007 | Proctor et al. | |
| 2007/0156364 A1 | 7/2007 | Rothkopf | |
| 2007/0226742 A1 | 9/2007 | Hung et al. | |
| 2007/0232369 A1 | 10/2007 | Yamashita et al. | |
| 2007/0238496 A1 | 10/2007 | Chung et al. | |
| 2007/0281735 A1 | 12/2007 | Suzuki | |
| 2008/0182531 A1 | 7/2008 | Lagnado et al. | |
| 2008/0280642 A1 | 11/2008 | Coxhill et al. | |
| 2008/0303681 A1 | 12/2008 | Herz et al. | |
| 2009/0088204 A1 | 4/2009 | Culbert et al. | |
| 2009/0175324 A1 | 7/2009 | Sampath et al. | |
| 2009/0305742 A1 | 12/2009 | Caballero et al. | |
| 2010/0195549 A1 | 8/2010 | Aragon et al. | |
| 2010/0216524 A1 | 8/2010 | Thomas et al. | |
| 2010/0248622 A1 | 9/2010 | Lyell Kirby et al. | |
| 2010/0271279 A1 | 10/2010 | Johnson | |
| 2010/0285828 A1 | 11/2010 | Panian et al. | |
| 2010/0291963 A1 | 11/2010 | Patel et al. | |
| 2010/0304730 A1 | 12/2010 | Huang et al. | |
| 2010/0317302 A1 | 12/2010 | Greenwood et al. | |
| 2011/0012793 A1 | 1/2011 | Amm et al. | |
| 2011/0034135 A1 * | 2/2011 | Ali et al. | 455/103 |
| 2011/0038271 A1 | 2/2011 | Shin et al. | |
| 2011/0086626 A1 | 4/2011 | Kerr | |
| 2011/0119144 A1 | 5/2011 | Grilli et al. | |
| 2011/0121892 A1 | 5/2011 | Bowdle | |
| 2011/0138198 A1 | 6/2011 | Boss et al. | |
| 2011/0212755 A1 | 9/2011 | Ishikawa et al. | |
| 2011/0264935 A1 | 10/2011 | Shetty et al. | |
| 2012/0164962 A1 | 6/2012 | Lin et al. | |
| 2012/0194454 A1 | 8/2012 | Margalit et al. | |
| 2012/0208478 A1 | 8/2012 | Greenwood et al. | |
| 2012/0282912 A1 | 11/2012 | Bychkov et al. | |

OTHER PUBLICATIONS

USPTO Office Action for U.S. Appl. No. 12/748,738 mailed Oct. 24, 2012.

USPTO Office Action for U.S. Appl. No. 12/748,738 mailed Dec. 31, 2012.

USPTO Office Action for U.S. Appl. No. 12/748,738 mailed Apr. 11, 2013.

USPTO Office Action for U.S. Appl. No. 12/823,074 mailed Feb. 27, 2013.

USPTO Office Action for U.S. Appl. No. 12/823,074 mailed Sep. 25, 2013.

USPTO Office Action for U.S. Appl. No. 12/748,970 mailed Mar. 26, 2012.

USPTO Office Action for U.S. Appl. No. 12/748,970 mailed Oct. 24, 2012.

USPTO Office Action for U.S. Appl. No. 12/748,970 mailed Jan. 29, 2013.

USPTO Office Action for U.S. Appl. No. 12/748,970 mailed Aug. 29, 2013.

USPTO Office Action for U.S. Appl. No. 12/748,738 mailed Oct. 9, 2013.

USPTO Office Action for U.S. Appl. No. 12/823,074 mailed Feb. 26, 2014.

USPTO Office Action for U.S. Appl. No. 12/748,738 mailed Feb. 25, 2014.

USPTO Notice of Allowance for U.S. Appl. No. 12/748,970 mailed Oct. 22, 2014.

USPTO Notice of Allowance for U.S. Appl. No. 12/748,738 mailed Sep. 11, 2014.

USPTO Notice of Allowance for U.S. Appl. No. 12/823,074 mailed Nov. 18, 2014.

* cited by examiner

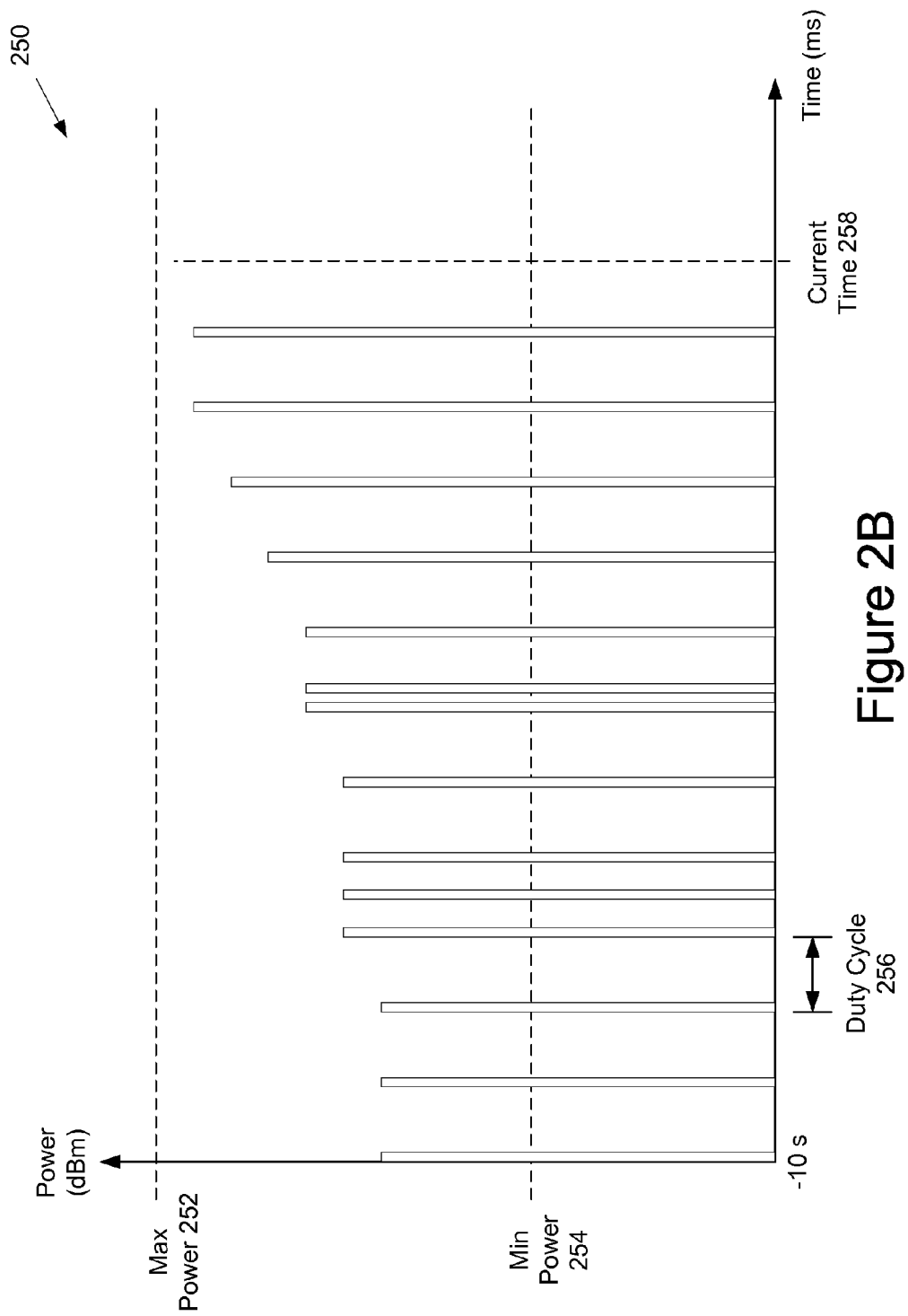

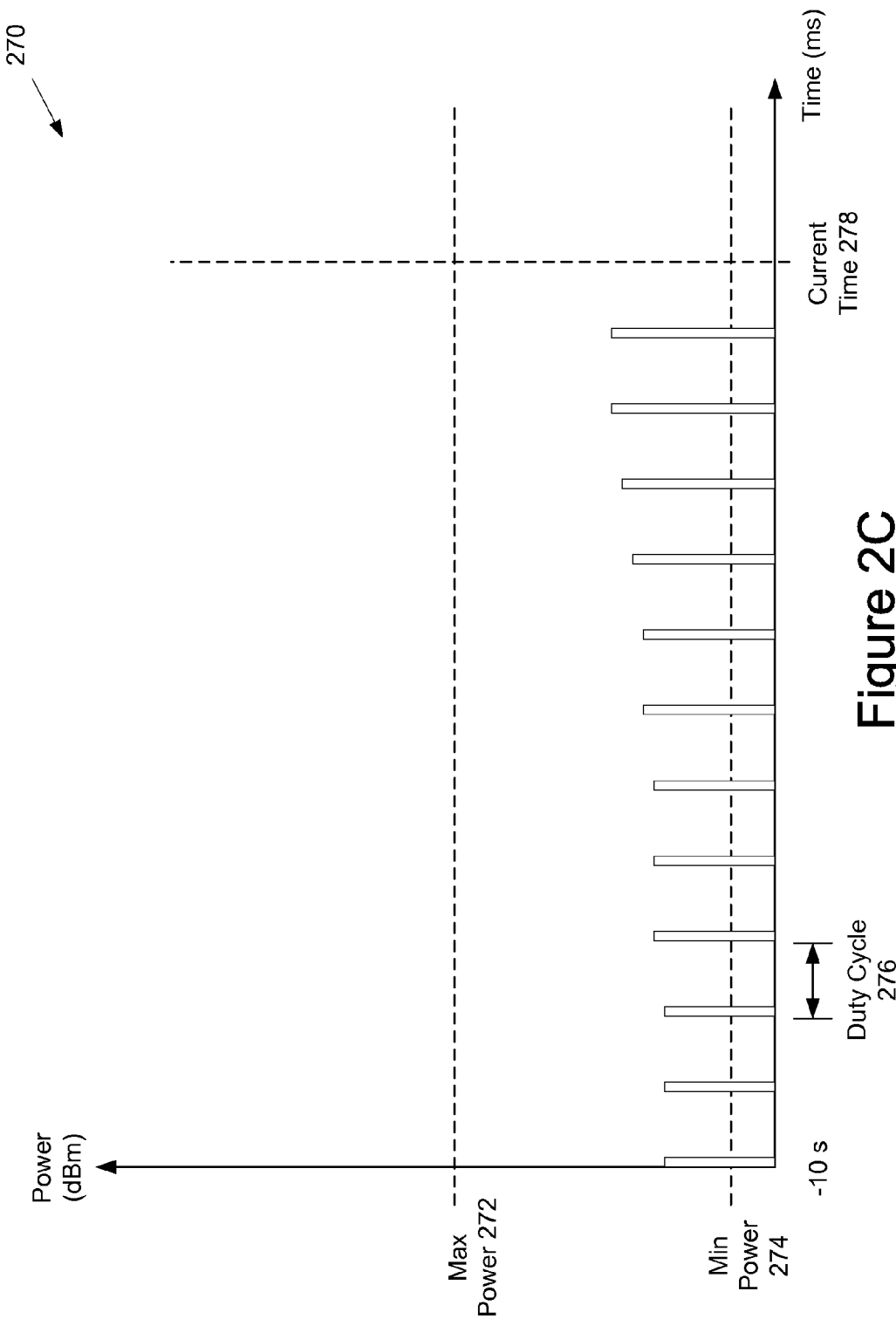

DUTY CYCLING TO REDUCE AVERAGE TRANSMIT POWER

RELATED APPLICATIONS

This patent application is a divisional of U.S. patent application Ser. No. 12/748,641, filed Mar. 29, 2010, which claims the benefit under 35 U.S.C. §119(e) of U.S. Provisional Application No. 61/297,644, filed Jan. 22, 2010, both of which are herein incorporated by reference.

BACKGROUND

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like. These electronic devices wirelessly communicate with a communications infrastructure to enable the consumption of the digital media items. Typically, the communications infrastructure dictates transmit power levels for the electronic devices to use when transmitting data to the communications infrastructure. The electronic devices do not include transmit power managers for making their own determinations regarding what transmit power levels to use.

Some bodies of research suggest that radiation output by electronic devices during wireless transmission of data can cause damage to the human body when such radiation is absorbed. However, since electronic devices lack the ability to control their transmit power levels, such electronic devices cannot adjust their transmit power levels to reduce user exposure to radiation. This may also consequently cause these electronic devices to fail to comply with FCC regulations regarding the specific absorption rate (SAR) permitted to electronic devices.

Some electronic devices are capable of connecting with multiple wireless communication infrastructures concurrently. Each such connection to a wireless communication infrastructure causes radiation to be emitted, thus causing such devices to expose users to even greater amounts of radiation. Additionally, these connections can frequently interfere with each other, reducing a quality of each connection.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIGS. 2B and 2C illustrate an example of data stored in two transmit power level logs.

DETAILED DESCRIPTION

Methods and systems for enabling a user device to control transmit power levels used to wirelessly transmit data are described. The user device may be any content rendering device that includes a wireless modem for connecting the user device to a network. Examples of such user devices include electronic book readers, cellular telephones, personal digital assistants (PDAs), portable media players, tablet computers, netbooks, and the like.

In one embodiment, a user device includes a transmit power manager to manage transmit power levels of the user device during wireless transmission of data. When the user device receives a command to transmit data at a transmit power level specified by a wireless carrier (or other communications infrastructure), the power manager makes a determination as to whether transmitting the data at the specified transmit power level will cause the user device to violate a condition. The condition may be, for example, a safety condition, an energy consumption condition, a security condition, a battery level condition, a communications interference condition, or some other type of condition. When it is determined that transmitting the data at the specified transmit power level will cause the user device to violate a condition, the transmit power manager dynamically computes a new transmit power level that is lower than the specified transmit power level. Preferably, the new transmit power level will not cause the user device to violate the condition. The user device then transmits the data at the new transmit power level.

In one embodiment, the user device may include one or more sensors that monitor for the presence of a human body part. These sensor(s) may be disposed at a back of the user device, and may be positioned proximate to one or more antennas of the user device to detect when human body parts are within a predetermined distance from the antenna(s). When the sensor(s) detect the presence of a human body part, the power manager may reduce the transmit power level below the specified transmit power level. This may reduce an amount of radiation that is absorbed by the human body part.

Figure 1:
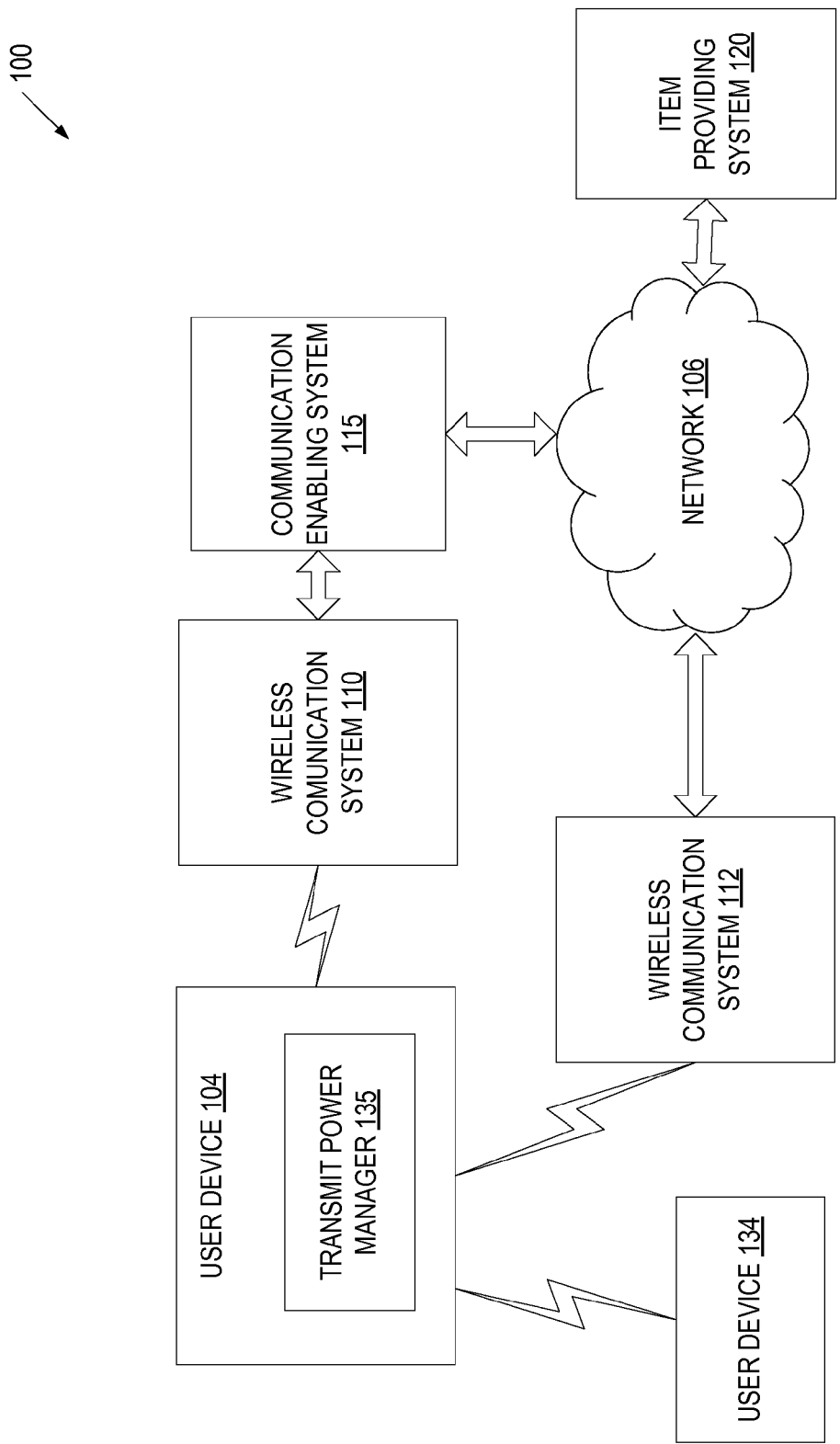
FIG. 1 is a block diagram of an exemplary network architecture.

FIG. 1 is a block diagram of an exemplary network architecture 100 in which embodiments described herein may operate. The network architecture 100 may include an item providing system 120 and one or more user devices 104 capable of communicating with the item providing system 120 via a network 106 (e.g., public network such as the Internet or private network such as a local area network (LAN)).

The user devices 104 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 104 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 120 and the user devices 104 deliver and/or receive items, upgrades, and/or other information via the network 106. For example, the user devices 104 may download or receive items from the item providing system 102. The item providing system 120 also receives various requests, instructions and other data from the user devices 104 via the network 106. The item providing system 120 may include one or more machines (e.g., one or more server computer systems, routers, gateways, etc.) that have processing and storage capabilities to provide the above functionality.

Communication between the item providing system 120 and the user device 104 may be enabled via any communication infrastructure. One example of such an infrastructure includes a combination of a wide area network (WAN) and wireless infrastructure, which allows a user to use the user device 104 to purchase items and consume items without being tethered to the item providing system 120 via hardwired links. The wireless infrastructure may be provided by one or multiple wireless communications systems, such as wireless communications system 110 and wireless communication system 112. One of the wireless communication systems 110, 112 may be a wireless fidelity (WiFi) hotspot connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the item providing system 120 and the wireless communication system 110. The communication-enabling system 115 may communicate with the wireless communication system 110 (e.g., a wireless carrier) via a dedicated channel, and may communicate with the item providing system 120 via a non-dedicated communication mechanism, e.g., a public Wide Area Network (WAN) such as the Internet.

In one embodiment, while the user device 104 is connected with the wireless communication system 110 and/or wireless communication system 112, one or both of the wireless communication systems periodically or continuously specifies transmit power levels for the user device 104 to use for transmissions to that wireless communication system 110, 112. For example, conventional wireless carrier systems dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on. Unfortunately, wireless communication systems 110, 112 typically consider only signal strength when specifying what transmit power levels the user device is to use in transmissions of data. Wireless communication systems 110, 112 typically do not take into consideration radiation emitted by the user device 104 that may be absorbed by users of the user device 104, interference with other wireless connections, battery life of the user device 104, or other factors that may also be important to a user when specifying transmit power levels. Additionally, the user device 104 may have additional information that is not available to the wireless communication systems 110, 112. This additional information may be used to help determine what transmit power levels should be used.

Embodiments of the invention overcome the above shortcomings by controlling the transmit power levels of the user device independent of the specified transmit power levels dictated by the wireless communication systems 110, 112. In one embodiment, the user device 104 includes a transmit power manager 135 that receives a specified transmit power level from the wireless communication system 110 and performs its own analysis of what transmit power levels should be used for the transmission of data to the wireless communication system 110. In one embodiment, the transmit power manager 135 uses the specified transmit power level as an upper threshold, and determines whether a transmit power level that is lower than the specified transmit power level should be used.

In addition to wirelessly connecting to a wireless communication system 110, 112, the user device 104 may also wirelessly connect with other user devices (e.g., user device 134). For example, user device 104 may form a wireless ad hoc (peer-to-peer) network with user device 134. In addition to controlling the transmit power levels used to communicate with the wireless communication systems 110, 112, the transmit power manager 135 may also control the transmit power used to communicate with other user devices 134.

Figure 2A:
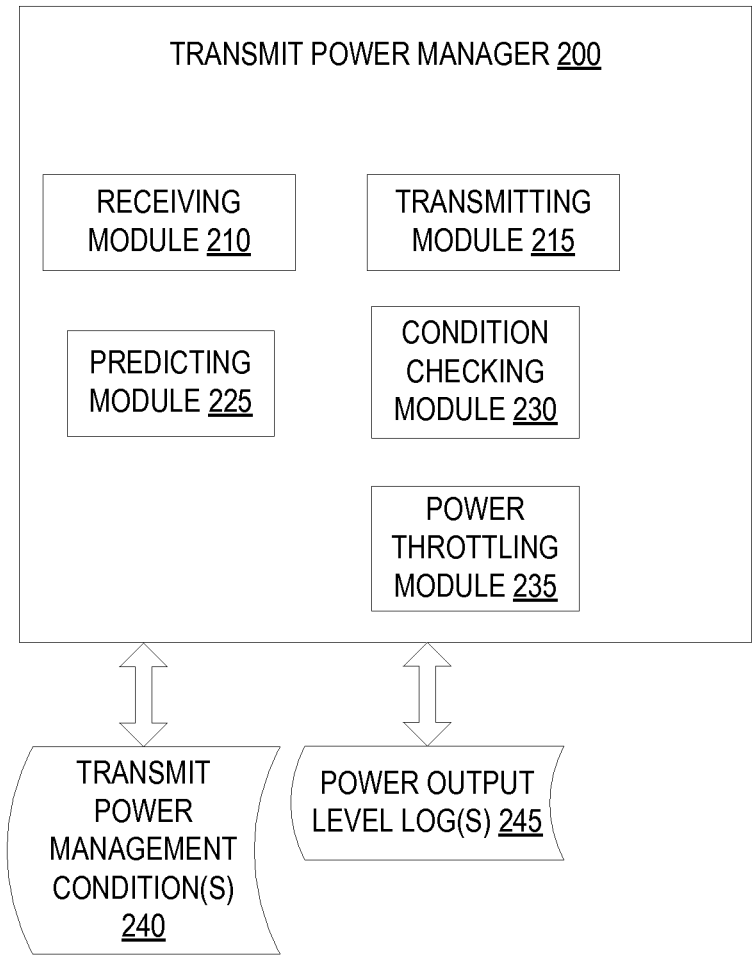
FIG. 2A is a block diagram of one embodiment of a transmit power manager.

FIG. 2A is a block diagram of one embodiment of a transmit power manager 200, which may correspond to the transmit power manager 135 of FIG. 1. In one embodiment, the transmit power manager 200 includes a receiving module 210, a transmitting module 215, a predicting module 225, a condition checking module 230 and a power throttling module 235. The receiving module 210 receives commands to transmit data, which may identify specified transmit power levels to use for data transmission. The commands may specify explicit transmit power levels to use (e.g., may specify that a transmit power level of +50 dbm is to be used), or may specify a current transmit power level as a change from a previously used transmit power level (e.g., an increase of 1 dbm or a decrease of 2 dbm). Commands may also indicate that a previously specified transmit power level should be used. Commands may originate from the wireless communication system, and may be routed to the transmit power manager 200 by a wireless modem and/or processor of the user device. These commands may also be received from other sources, such as applications running on the user device.

Condition checking module 230 determines whether any transmit power management conditions 240 apply to transmissions that are to be made. The transmit power management conditions 240 may include safety conditions, communications interference conditions, battery level conditions, power consumption conditions, and so on. The transmit power management conditions 240 may apply to communications via a particular wireless communication protocol, with a particular wireless communication system, associated with a particular application, etc. Some transmit power management conditions 240 may apply to multiple wireless protocols, wireless communications systems, applications, etc. For those transmit power management conditions 240 that apply to a current transmission, condition checking module 230 determines whether the conditions will be violated by the current transmission. For example, condition checking module 230 may determine whether transmit power management conditions will be violated by transmitting data at the specified transmit power level.

In one embodiment, the transmit power management conditions 240 include a human body part proximity condition. This condition may be violated (or alternatively satisfied) when a human body part is detected, or when it is determined that a human body part is closer than a predetermined distance from an antenna of the user device.

In one embodiment, the power management conditions 240 include a maximum accumulated transmit power level condition. This transmission power management condition 240 may be violated when it is determined that more than the maximum accumulated transmit power level has been emitted within a proximity of a user over a sample period. The maximum accumulated transmit power level condition may be combined with the human body part proximity condition. Thus, the transmit power levels used while a human body part is detected may be recorded and summed to determine the amount of radiation to which the user has been exposed. When it is determined that the detected human body part has been exposed to more than a threshold amount of radiation (based on the accumulated transmit power levels), the condition may be violated.

In one embodiment, the condition checking module 230 checks the specified transmit power level against a communications interference condition. This condition may be satisfied if there are two or more concurrent connections with different wireless communication systems and/or user devices. Alternatively, this condition may be satisfied when interference is detected between two or more concurrent connections.

In one embodiment, the power management conditions 240 include an active application condition. The active application condition may be satisfied when a particular application (e.g., an ad hoc network application) is running on the user device. Alternatively, this condition may be satisfied when a particular operation of a specified application is to be performed (e.g., a file transfer operation).

In one embodiment, the transmit power management conditions 240 include a security condition such as a maximum transmit distance condition. The maximum transmit distance condition may be satisfied when certain applications are active, when certain operations are being performed and/or when certain types of wireless connections are established. The maximum transmit distance condition may cause a transmit power level to be reduced to a level just powerful enough to transmit to nearby devices (e.g., to devices within a range of 6 feet from the user device). For example, the free space loss of radio transmissions is about 38 dBm. Therefore, at a distance of 2 meters, the power loss is approximately 44 dBm. If a sensitivity of −50 dBm is sufficient to maintain a connection, then the transmit power level may be reduced to 5 dBm, and devices within 2 meters will still have at least a sensitivity of approximately −39 dBm. This can increase transmission security by preventing devices outside of a maximum distance from receiving transmissions.

In one embodiment, the transmit power management conditions 240 include one or more negative power throttling conditions that specify when power throttling should not occur. For example, one or more negative power throttling conditions can specify that, regardless of other power management conditions that may be violated, power throttling should not occur if a particular application is active, or a particular operation is being performed. For example, a power management condition may specify that transmit power level throttling should not occur while media items are being downloaded.

The transmit power management conditions 240 may be stored in volatile or nonvolatile memory of the user device 104. In one embodiment, the power management conditions 240 are hard coded into the user device, and cannot me modified. Alternatively, the transmit power management conditions 240 may be updated by modifying existing power management conditions, adding new power management conditions, or deleting existing power management conditions.

In one embodiment, the condition checking module 230 maintains a transmit power level log 245 associated with transmit power levels of a particular antenna (or radio). In another embodiment, the condition checking module 230 maintains a transmit power level log 245 associated with transmit power levels of all antennas of the user device. Alternatively, the condition checking module 230 may maintain separate transmit power level logs for each antenna. The transmit power level log or logs 245 are records of past transmit power levels that have been used (e.g., in a defined sample period). The sample period may be, for example, 5 seconds, 10 seconds, 1 minute, 10 minutes, and so on. For some power management conditions 240, such as the maximum accumulated transmit power level, the transmit power level log 245 is used to determine whether the power management condition 240 has been or will be violated.

FIGS. 2B and 2C illustrate a representation of data stored in two transmit power level logs 250 and 270, respectively. Transmit power level log 250 and transmit power level log 270 may each be records of past transmit power levels of two different antennas of the user device. For example, transmit power level log 250 may be a record of transmit power levels used by an antenna that is configured to communicate with a wireless carrier via GSM, while transmit power level log 270 may be a record of transmit power levels used by another antenna that is configured to communicate with a hotspot or user device via WiFi. Transmit power level logs 250, 270 maintain transmit power levels (e.g., in dBm) used over the past 10 seconds (from −10 seconds to current time 258). However, other sample periods may also be used. The illustrated transmit power level logs 250, 270 further identify a maximum transmit power level 252 and 272, respectively, that an associated antenna is capable of outputting and a minimum transmit power level 254 and 274, respectively, below which wireless connections cannot or will not be maintained. Note that the maximum transmit power level 252 is shown to be greater than the maximum transmit power level 272. Similarly, the minimum transmit power level 254 is shown to be greater than the minimum transmit power level 274. This may be the case, for example, when transmit power level log 250 is for a GSM antenna and transmit power level log 270 is for a WiFi antenna, which typically use different transmit powers. For example, transmit power levels of radio transmissions using GSM may be as much as an order of magnitude higher than transmit power levels for radio transmissions using WiFi.

Transmit power level log 250 shows a duty cycle 256, and transmit power level log 270 shows a duty cycle 276. These duty cycles 256, 276 each represent a ratio of the times in which the associated antennas are transmitting to the times in which they are not transmitting. As shown, in both duty cycles 256 and 276 the amount of time spent transmitting data is typically less than the amount of time in which data is not being transmitted. The duty cycles for different antennas may be the same, or they may differ slightly or dramatically. The higher the duty cycle, the more radiation is output. Accordingly, if the duty cycle were to be reduced, the radiation emitted in a sample period would also be reduced.

Returning to FIG. 2A, in one embodiment, the transmit power manager 200 includes a predicting module 225 that predicts future transmit power levels that will be specified by a wireless communication system. These predictions may be used by the condition checking module 230 to predict whether transmission power management conditions 240 are likely to be violated in the future. Some transmission power management conditions 240 may also incorporate such predicted transmit power levels. For example, violation of some power management conditions 240 may be contingent upon particular transmit power level predictions. For example, if it is determined that a maximum accumulated power output level will be reached in the near future, power throttling may begin for current transmissions to prevent such an occurrence.

Power throttling module 235 reduces a transmit power level used to transmit data to the wireless carrier system when one or more transmit power management conditions 240 have been violated. The power throttling module 235 may reduce the transmit power level below a specified transmit power level incrementally. For example, the power throttling module may reduce the transmit power level in 1 db increments until a suitable transmit power level is reached. In one embodiment, a suitable transmit power level is an output level that will not cause any of the transmission power management conditions to be violated. Alternatively, a suitable transmit power level may be a level that will cause the transmission power management condition to stop being violated at some point in the future. For example, a suitable transmit power level may cause a trend towards eventual compliance with the violated transmission power management conditions 240.

Alternatively, the power throttling module 235 may compute or otherwise identify a suitable transmit power level, and reduce the current transmit power level to the suitable transmit power level in a single action. For example, a transmit power management condition 240 may specify that when the condition is violated, the transmit power level should be reduced to a predetermined transmit power level.

Power throttling module 235 may also reduce a duty cycle for the transmissions (e.g., space out the transmissions over time). Therefore, the power throttling module may adjust both the transmit power levels used for transmission and the frequency of those transmissions.

Transmitting module 215 transmits data to a wireless communication system or additional user device at either a specified transmit power level (e.g., as specified by the wireless communication system) or at a transmit power level determined by the power throttling module 235. The transmitting module 215 may transmit the data through one or more antennas included in the user device.

Figure 3:
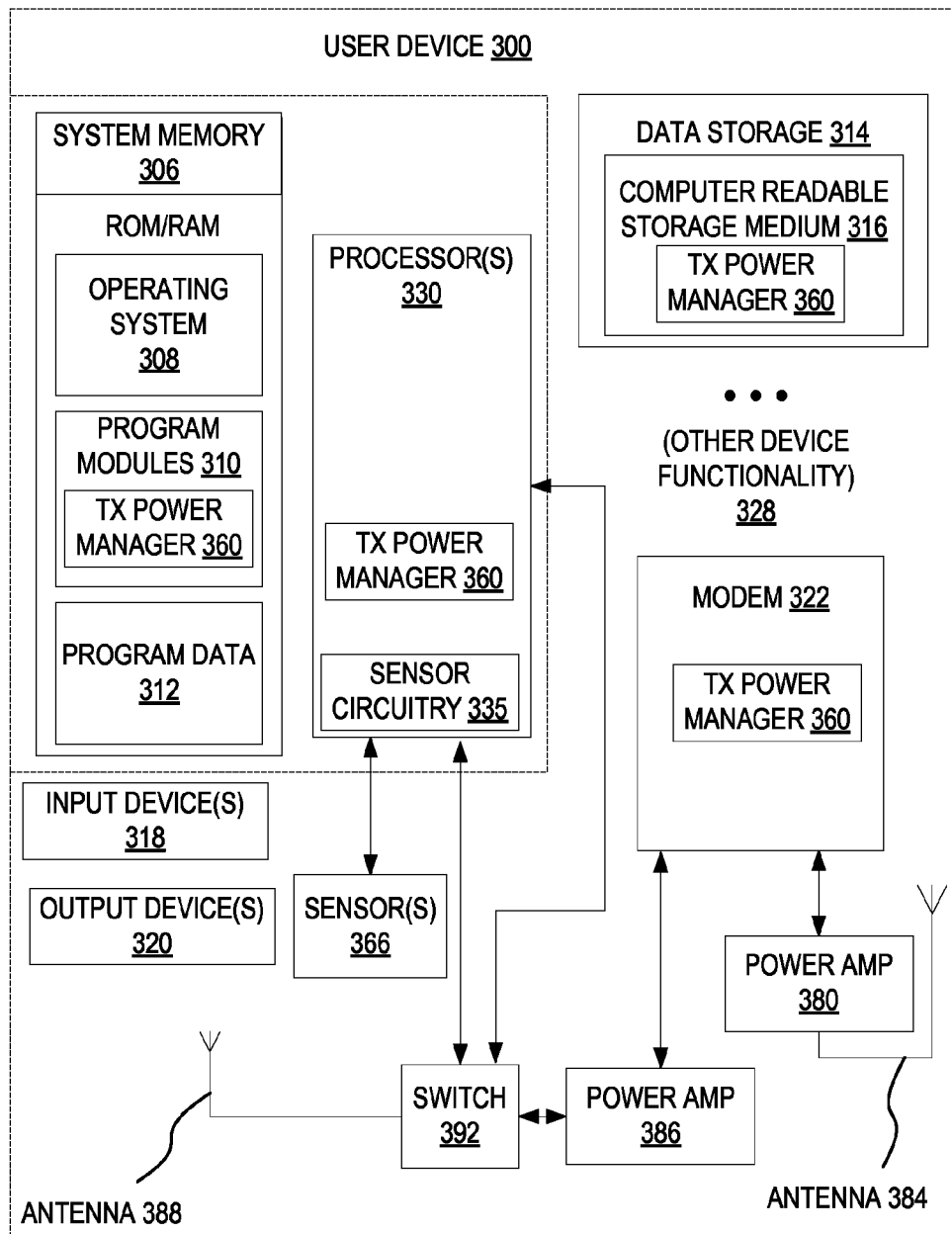
FIG. 3 is a block diagram illustrating an exemplary user device.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as transmit (TX) power manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the transmit power manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the item providing system, and so forth. The wireless modem 322 allows the user device 300 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. In one embodiment, the wireless modem includes the transmit power manager 360 in addition to, or instead of, the transmit power manager 360 being included in the computer readable storage medium 316, system memory 306 and/or processor(s) 330.

The transmit power manager 360 may be implemented as hardware, firmware and/or software of the wireless modem 322.

The wireless modem 322 may generate signals and send these signals to power amplifier (amp) 380 or power amp 386 for amplification, after which they are wirelessly transmitted via antenna 384 or antenna 388, respectively. Antenna 384 and 388 may be configured to transmit in different frequency bands and/or using different wireless communication protocols. The antennas 384, 388 may be directional, omnidirectional or non-directional antennas. In addition to sending data, antennas 384, 388 also receive data, which is sent to wireless modem 322 and transferred to processor(s) 330.

Though a single modem 322 is shown to control transmission to both antennas 384 and 388, the user device 300 may alternatively include multiple wireless modems, each of which is configured to transmit data via a different antenna and/or wireless transmission protocol. In one embodiment, each modem includes an independent transmit power manager. Alternatively, a single transmit power manager (e.g., that is included in system memory 306, processor 330 and/or data storage 314) may control transmit power levels used by each wireless modem. In addition, the user device 300, while illustrated with two antennas 384, 388, may include more or fewer antennas in various embodiments.

In one embodiment, user device 300 includes one or more sensors 366 such as a physical contact sensor or close proximity sensors. The sensors 366 can detect the presence of human body parts, and convey information regarding the detected presence to processor(s) 330. In one embodiment, the sensors 366 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

The processor(s) 330 may include sensor circuitry 335 (e.g., sensor device drivers) that enables the processor(s) 330 to interpret signals received from the sensor(s) 366. In one embodiment, the sensors 366 output fully processed signals to the processor(s) 330. For example, the sensors 366 may output a distance, a detected/not detected signal, etc. using a single line interface or a multi-line interface. In another embodiment, the sensors 366 output, for example, positional data and/or object presence data (e.g., of a human body part) to the processors 330 without first processing the data. In either instance, the processors 330 may use the sensor circuitry 335 to process and/or interpret the received data. If data is received from multiple sensors 366, processing the data may include averaging the data, identifying a maximum from the data, or otherwise combining the data from the multiple sensors. In one embodiment, in which the sensors 366 include a sensor array, numerous sensors, or a touch panel, processing the data includes determining where on the user device the human body part is located from multiple sensor readings.

In one embodiment, antenna 388 is used as a proximity sensor (e.g., as a sensor electrode for a proximity sensor). To enable the use of antenna 388 as a proximity sensor, a switch 392 disconnects the antenna 388 from power amp 386 (and thus from modem 322), and connects antenna 388 to sensor circuitry 335 and/or to a proximity sensor integrated circuit (not shown) that connects to sensor circuitry 335. While there is an electrical connection between sensor circuitry 335 and antenna 388, the antenna 388 provides signals to sensor circuitry 335. The sensor circuitry 335 processes the signals to determine whether the presence of a human body part is detected. While there is an electrical connection between antenna 388 and power amp 386, antenna 388 may be used to transmit and receive information (e.g., to maintain a wireless connection). In one embodiment, by default the switch 392 maintains an electrical connection between power amp 386 and antenna 388.

In one embodiment, processor 330 controls whether the switch 392 provides an electrical connection between the sensor circuitry 335 and the antenna 388 or between the power amp 386 and the antenna 388. Alternatively, or in addition, modem 322 may control switch 392. Switch 392 may provide an electrical connection between sensor circuitry 335 and antenna 388 on a periodic or other basis (e.g., every 500 ms or ever 1 s). The electrical connection between the sensor circuitry 335 and the antenna 388 may then be sustained for a predetermined time period (e.g., 100 ms), after which the electrical connection between the antenna 388 and sensor circuitry 335 is terminated, and an electrical connection between the power amp 386 and the antenna 388 is established. In one embodiment, it is determined when antenna 388 will not be sending or receiving data, at which point switch 392 establishes an electrical connection between antenna 388 and sensor circuitry 335.

Note that an additional switch (not shown) may be interposed between power amp 380 and antenna 384, which may function in the manner described above with reference to switch 392. The additional switch may have connections to sensor circuitry 335 and processor 330 as shown for switch 392.

Figure 4A:
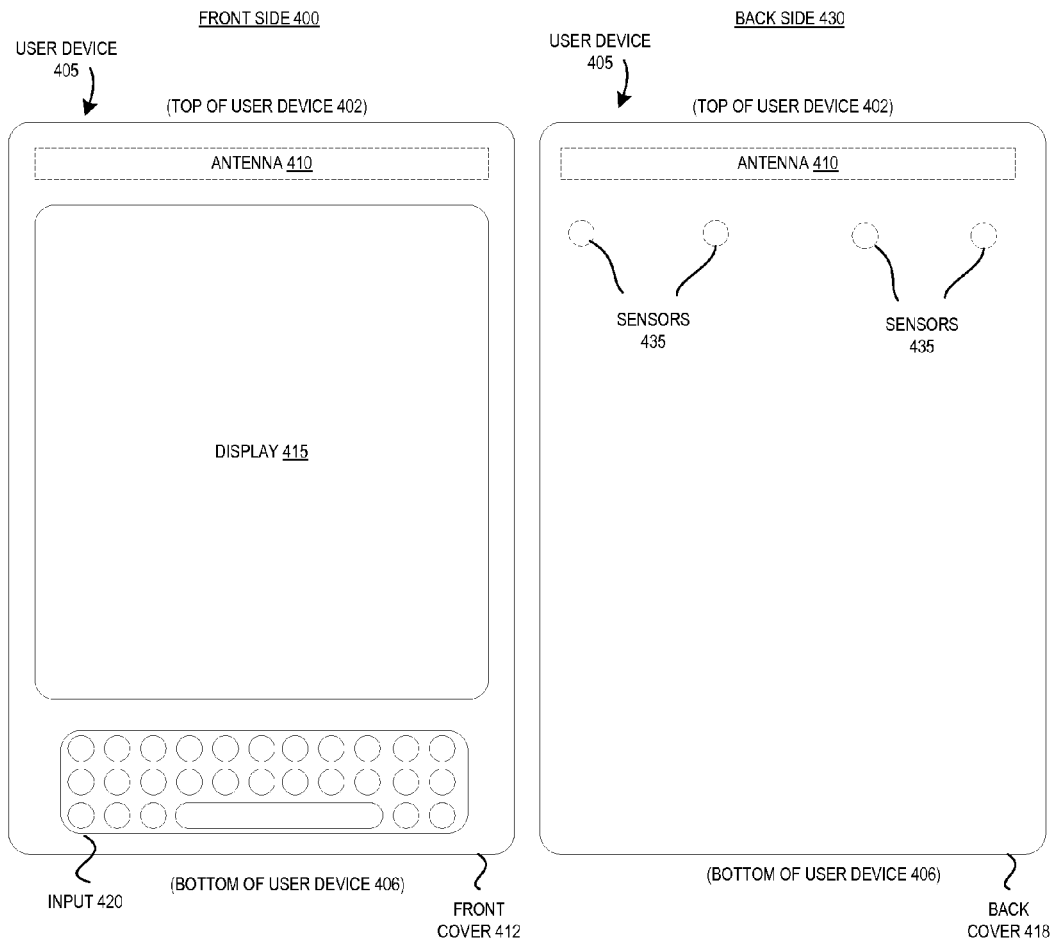
FIG. 4A illustrates an example of a front side and back side of a user device.

FIGS. 4A-4D illustrate various embodiments of a user device 405. Referring to FIG. 4A, a front side 400 and back side 430 of user device 405 are shown. The front side 400 includes a display 415 and optionally an input 420 housed in a front cover 412. The display 415 may use any available display technology, such as electronic ink (e-ink), liquid crystal display (LCD), transflective LCD, light emitting diodes (LED), laser phosphor displays (LSP), and so forth. The input 420 may include a keyboard, touch pad, or other input mechanism. In one embodiment, the display 415 and input 420 are combined into one or more touch screens.

Disposed inside the user device 204 is an antenna 410 and one or more sensors 435. As shown, the antenna 410 is positioned near a top 402 of the user device. However, the antenna may also be positioned at other locations, such as at a side of the user device 405 or near the bottom 406 of the user device 405.

Disposed at a back side of the user device 405 are one or more sensors 435. The sensors 435 may be proximity sensors such as inductive sensors, capacitive sensors, magnetic sensors, infrared sensors, ultrasonic sensors, or the like. The sensors 435 may also be touch sensors such as a resistive touch sensor, a capacitive touch sensor, a mechanical touch sensor (e.g., a mechanical button), or the like.

The antenna 410 and sensors 435 are shown in the illustrated embodiment using dashed lines to indicate that these components are not on a surface of the user device 402 (e.g., that they are inside a back cover 418). However, in alternative embodiments these components may be on a surface of the user device 405.

Note that in one embodiment the sensors 435 are disposed proximate to the antenna 410 to detect when a human body part is close to the antenna 410. This may include detecting a distance between the antenna 410 and the human body part. The sensors 435 may be disposed in an approximately linear pattern as shown in FIG. 4A. Alternatively, the sensors 435 may be disposed in other patterns at the back side of the user device 405. Such additional patterns may include a square pattern as shown in FIG. 4D, an elliptical pattern, a checkerboard pattern, or other pattern. The sensors 435 may be discrete sensors (as shown), or may be linear sensor arrays, other sensor arrays, a touch panel, slider sensors, or the like. The sensors 435 may also be a single proximity. For example, a single proximity sensor may be included that is substantially equal to the size of the entire back 418 of the user device 405. As shown, the sensors 435 are disposed between the antenna 410 and the bottom 406 of the user device 405. However, one or more sensors 435 may also be disposed at other locations with relation to the antenna 410, such as between the antenna 410 and the top 402 of the user device 405. Though sensors 435 are shown only at the back side 430 of the user device 405, the front side 400 of the user device 405 may also include other sensors. In one embodiment, as described above with reference to FIG. 3, the antenna 410 itself acts as a proximity sensor. In such an embodiment, some or all of sensors 435 may be omitted.

Figure 4B:
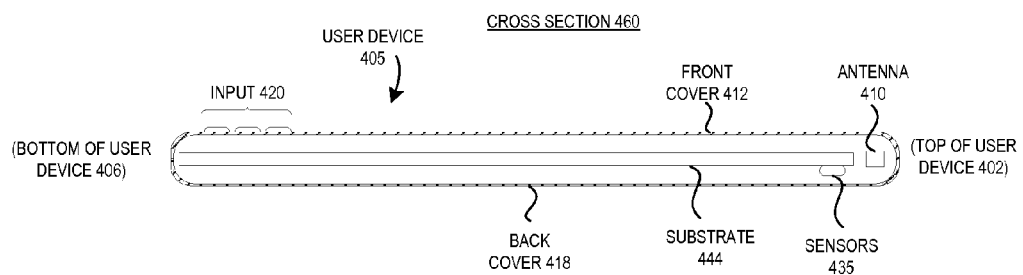
FIGS. 4B and 4C illustrate cross-sectional side views of the user device.
Figure 4C:
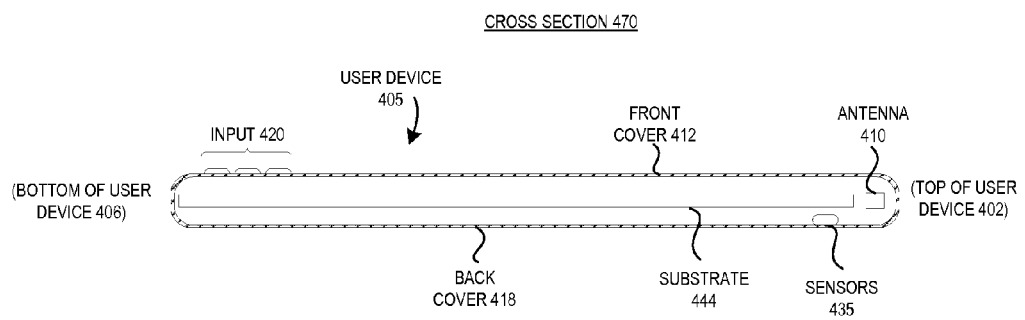
Figure 4D:
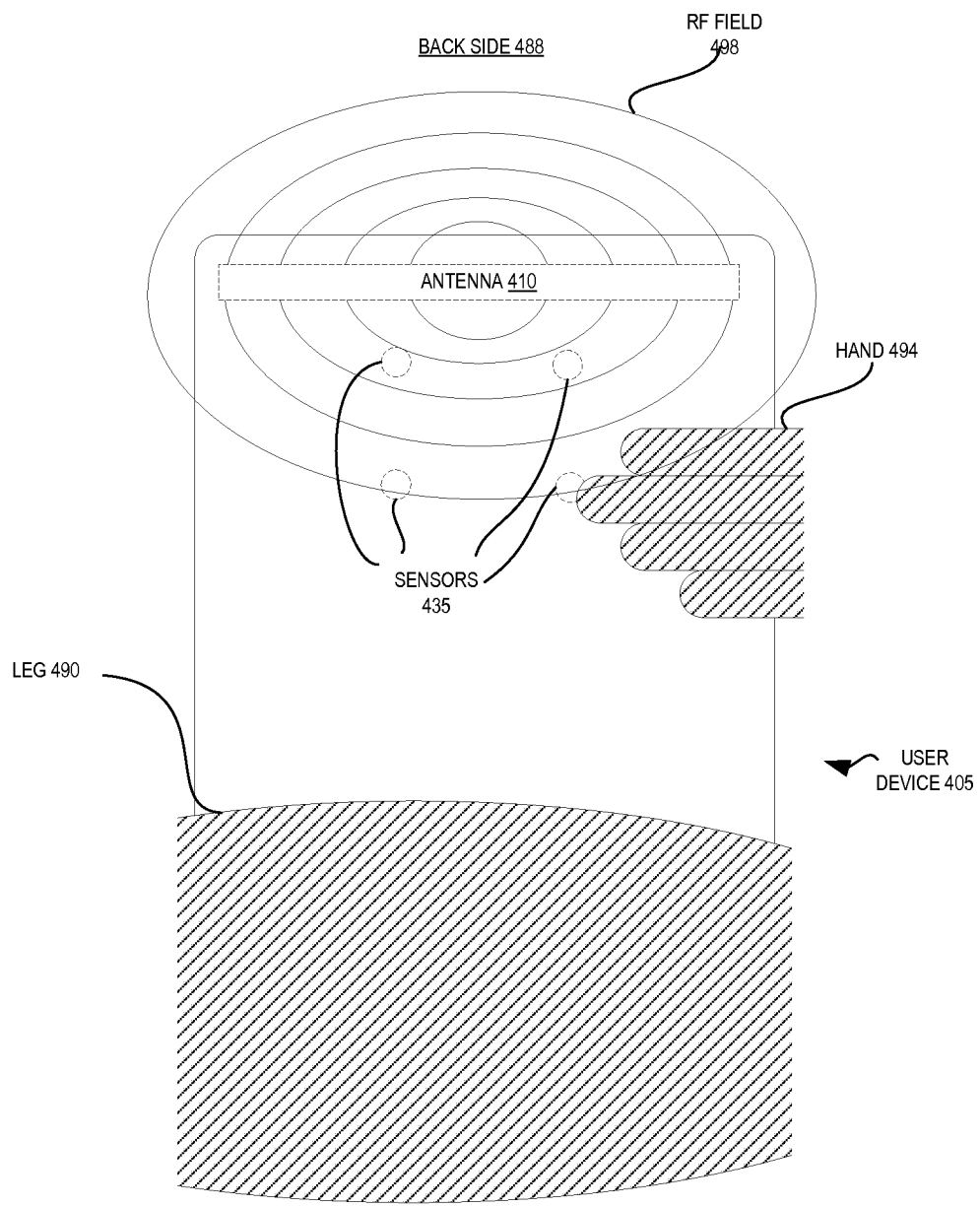
FIG. 4D illustrates a back side of a user device in contact with portions of a human body.

FIGS. 4B and 4C illustrate cross-sectional side views 460 and 470 of the user device 405, in accordance with two embodiments of the present invention. Both cross-sectional side views 460, 470 show the antenna 410 and sensors 435 housed within the front cover 412 and back cover 418 of the user device 405. However, cross-sectional side view 460 shows the sensors 435 being attached to an underside of a non-conductive substrate 444, which may be a rigid substrate (e.g., a printed circuit board (PCB)) or a flexible substrate (e.g., a polyimide film, polyester film, or polyether ether ketone (PEEK) film), while cross-sectional side view 470 shows the sensors 435 being attached to an inside of the back cover 418. In other embodiments, the sensors 435 may alternatively be positioned within the back cover 418 such that they are flush with the outer perimeter of the back cover 418, protrude outside of the back cover 418 or recede within the back cover 418. Some sensors 435 may also be attached to a front of the non-conductive substrate 444 (e.g., a PCB) or to an inside of the front cover 412.

FIG. 4D illustrates a back side 488 of a user device 405 that is in contact with portions of a human body. Specifically, a user's hand 494 and leg 490 are shown to be in contact with the back side 488 of the user device 405. During transmission of data, antenna 410 emits a radio frequency (RF) field that may be absorbed by the portions of the human body (e.g., by the hand 494 and/or leg 490). The amount of power/radiation that may be absorbed from the RF field 498 by the portions of the human body are based on a distance of the human body part from the antenna 410. The power of the RF field 498 drops off at a rate of $1/d^2$, where d is distance from the antenna 410. Accordingly, the closer a human body part is to the antenna 410, the more radiation that may be absorbed. In the example illustrated in FIG. 4D, the leg 490 would only absorb a nominal amount of radiation from the RF field 498 because of the distance between the antenna 410 and the leg 490. However, the hand 494 may be close enough to the antenna 410 to possibly absorb elevated amounts of radiation.

The hand 494 is positioned over one of sensors 435. Thus, the sensors 435 detect the presence of the hand 494. In some embodiments, depending on the sensor type, the sensors may detect the presence of a human body part even if the human body part is not in direct contact with the sensor 435 or not positioned directly over the sensor 435. For example, capacitive sensors, inductive sensors, optical sensors, ultrasonic sensors and the like may detect objects that are proximate to, but not touching, the sensors. If sensors 435 are positioned across the entire back side 488 (e.g., in a sensor array), then signals from multiple sensors can be processed to visualize a size, shape and/or position of a detected object. This may enable the user device 405 to identify whether a detected object is a human body part, as well as a distance between the human body part and the antenna 410. If the antenna 410 acts as a sensor, it may be sensitive enough to detect the proximity of hand 494 and/or leg 490.

Upon detection of the hand 494, the user device 405 may throttle an output power level used to transmit data via the antenna 410, or may restrict transmission of data entirely. Such throttling or restriction may remain in place until the hand 494 is no longer detected, at which time normal output power levels may be used for the transmission of data. Embodiments of power throttling are discussed in greater detail below with reference to FIGS. 6-13.

Figure 5A:
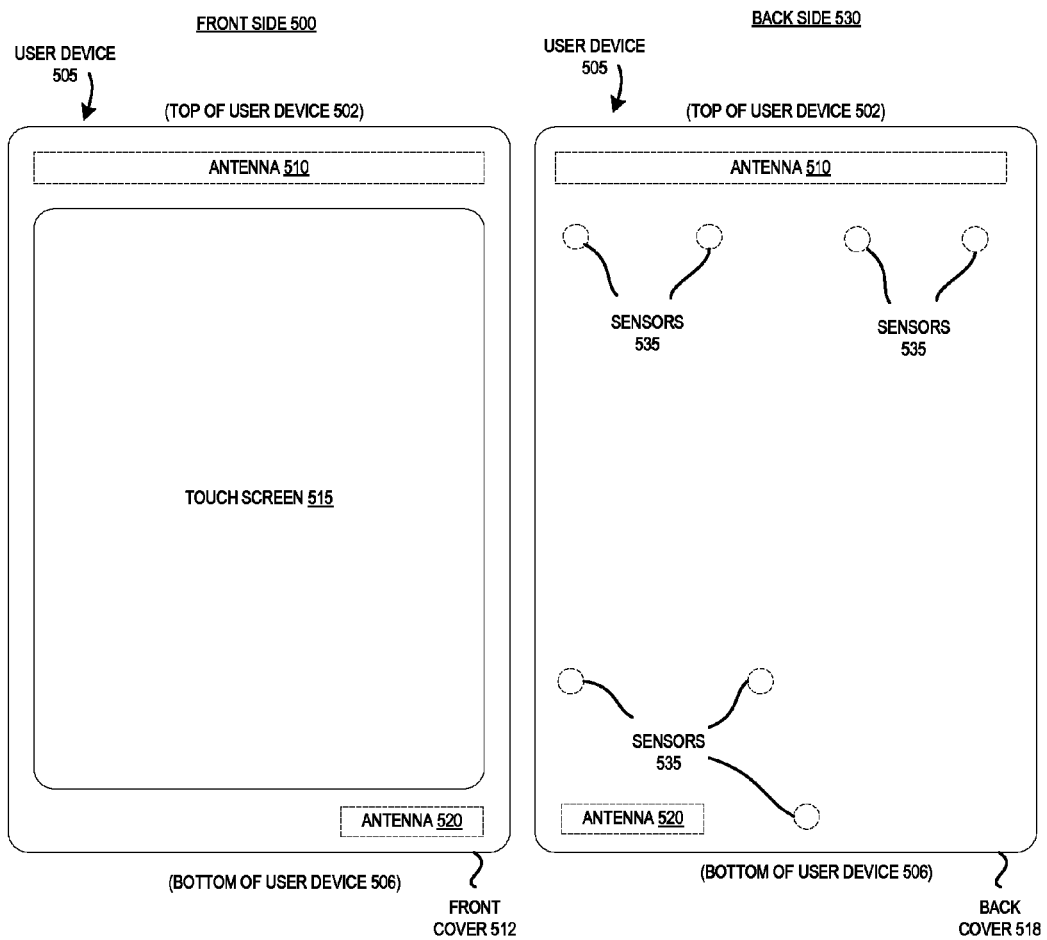
FIG. 5A illustrates an embodiment in which a user device includes multiple antennas.
Figure 5B:
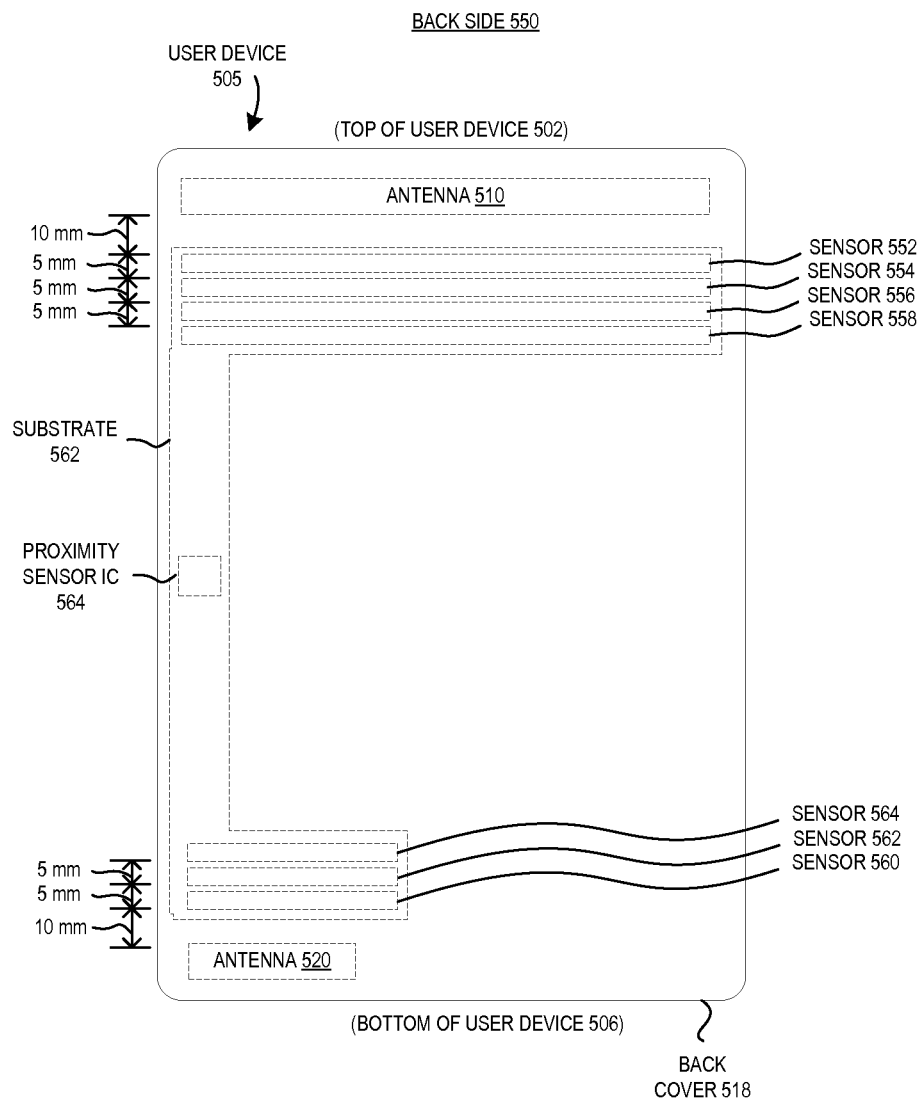
FIG. 5B illustrates a back side of a user device.
Figure 5C:
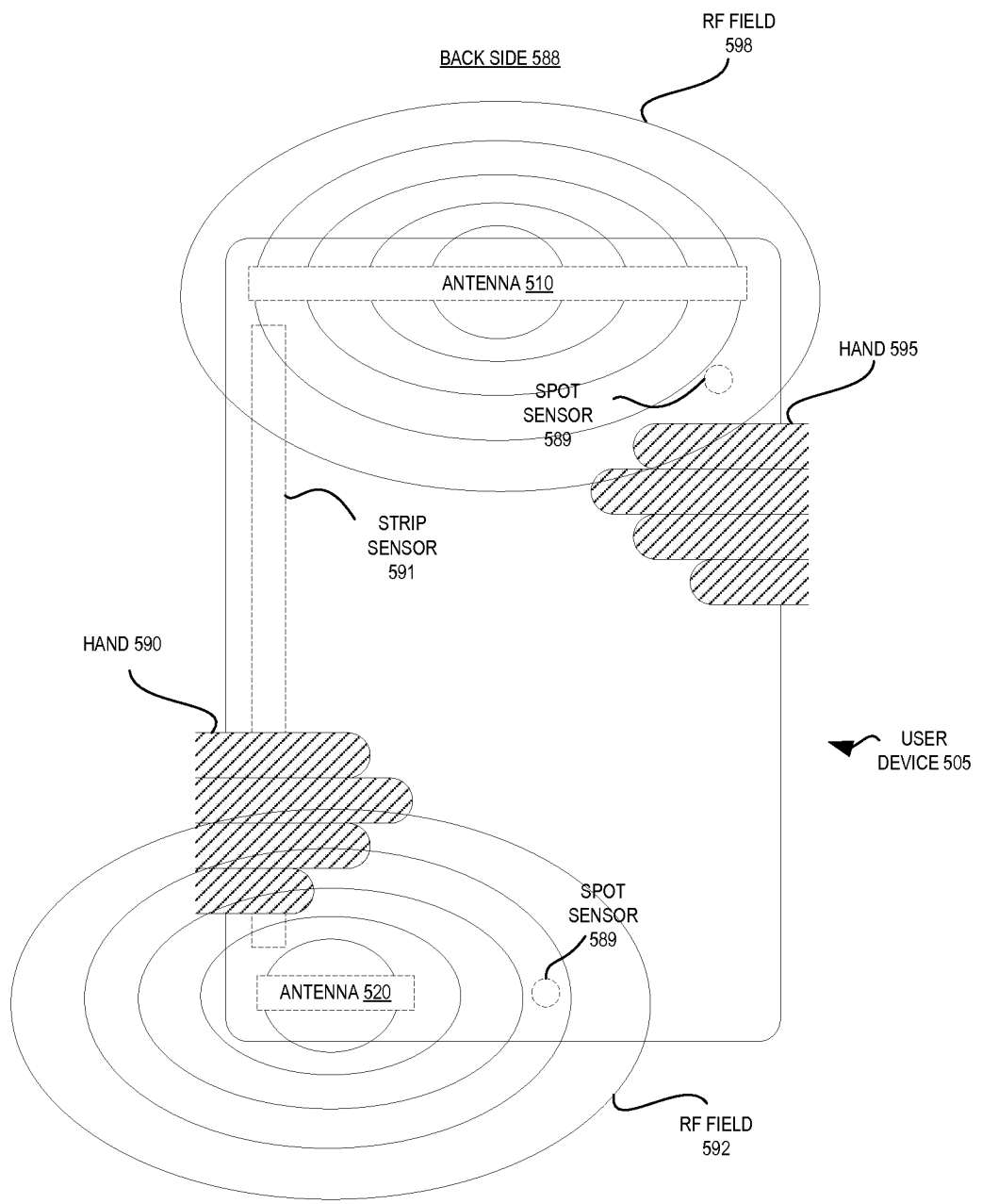
FIG. 5C illustrates a back side of a user device having two antennas in contact with portions of a human body.

FIGS. 5A-5C illustrate embodiments in which a user device 505 includes multiple antennas. In FIG. 5A, views of a front side 500 and back side 530 of the user device 505 show an antenna 510 positioned near a top 502 of the user device 505 and an antenna 520 positioned near a bottom 506 of the user device 505. The antennas 510, 520 are positioned at opposite ends of the user device 505 to minimize interference between signals generated by the antennas 510, 520. However, the antennas 510, 520 may also be positioned closer together. For example, antenna 510 may be positioned near the top 502 of the user device 505 as shown, and antenna 520 may be positioned at a side of the user device 505. In one embodiment, the antennas 510, 520 are positioned less than approximately 15 cm apart, which is the distance at which interference is typically introduced between antennas in user devices such as mobile phones. Such minimal separation between the antennas can be achieved without interference problems in one embodiment of the present invention due to a fine grained control of transmit power levels provided by the transmit power manager 135.

When multiple antennas 510, 520 are used, sensors 535 may be positioned proximate to each antenna 510, 520. Alternatively, or in addition, one or both of antenna 510 and antenna 520 may function as proximity sensors. When a human body part is detected near an antenna, the transmit power level for that antenna may be throttled. Alternatively, the transmit power levels for both antennas may be throttled when any sensor 535 detects the presence of a human body part.

FIG. 5B illustrates a back side 550 of the user device 505, in accordance with one embodiment of the present invention. The back side 550 of the user device 505 shows an antenna 510 positioned near a top 502 of the user device 505 and an antenna 520 positioned near a bottom 506 of the user device 505. Multiple sensors 552-558 are positioned proximate to antenna 510, and multiple sensors 560-564 are positioned proximate to antenna 520. In one embodiment, each of sensors 552-558 is disposed at a predetermined distance from antenna 510. For example, as shown sensor 552 is located 10 mm from antenna 510, sensor 554 is located 15 mm from antenna 510, sensor 556 is located 20 mm from antenna 510 and sensor 558 is located 25 mm from antenna 510. Depending on which of sensors 552-558 detect the presence of a human body part and/or relative strengths of detection signals generated by the sensors 552-558, a distance between the human body part and antenna 510 may be determined. For example, if sensor 556 detects the presence of a human body part, it may be determined that the human body part is 20 mm from antenna 510. Similarly, each of sensors 560-564 may be disposed at a predetermined distance from antenna 520. For example, sensor 560 is 10 mm from antenna 520, sensor 562 is located 15 mm from antenna 520 and sensor 564 is located 20 mm from antenna 520. Depending on which of sensors 560-564 detect the presence of a human body part, a distance between the human body part and antenna 520 may be determined.

In one embodiment, each of sensors 552-564 is a sensor electrode that is mounted on a substrate 562, which may be a flexible substrate (e.g., polyimide, polyester, polyether ether ketone, etc.) or rigid substrate (e.g., a printed circuit board). Substrate 562 may have mounted thereon a proximity sensor integrated circuit 564 that may be electrically connected to each of the sensor electrodes (e.g., sensors 552-564).

FIG. 5C illustrates a back side 588 of a user device 505 having two antennas 510, 520 that is in contact with portions of a human body, in accordance with one embodiment of the present invention. Specifically, a user's left hand 595 and right hand 590 are shown to be in contact with the back side 588 of the user device 505. During transmission of data, each antenna 510, 520 emits a radio frequency (RF) field 598, 592 that may be absorbed by the portions of the human body (e.g., by the hands 590, 595). The illustrated right hand 590 would only potentially absorb an elevated amount of radiation from RF field 592, while left hand 595 would possibly absorb an elevated amount of radiation from RF field 598.

In one embodiment, the user device 505 includes multiple sensors for detecting the presence of human body parts (or potentially other objects). In one embodiment, the sensors include one or more spot sensors 589 and one or more strip sensors 591. Spot sensors 589 may have small sensing elements with a limited sensing range, while strip sensors 591 may have a large sensing element or elements that are able to detect the proximity of a human body part across a large area. For example, the illustrated strip sensor 591 can detect the presence of a human body part anywhere along a back right side of the user device 505. In one embodiment, in which the strip sensor 591 is a linear array of sensors or a slider sensor, the strip sensor 591 is capable of identifying where the hand 590 is positioned along the strip (e.g., nearer antenna 510 or antenna 520).

Upon detection of the hand 595 near antenna 510, the user device 505 may throttle an output power level used to transmit data via the antenna 510. Upon detection of the hand 590 near antenna 520, the user device 505 may throttle an output power level used to transmit data via the antenna 520. Alternatively, the user device 505 may throttle an output power of both antenna 510 and 520 upon detecting the presence of any human body part, whether it is detected closer to antenna 510 or antenna 520. Embodiments of power throttling are discussed in greater detail below with reference to FIGS. 6-13.

Figure 6:
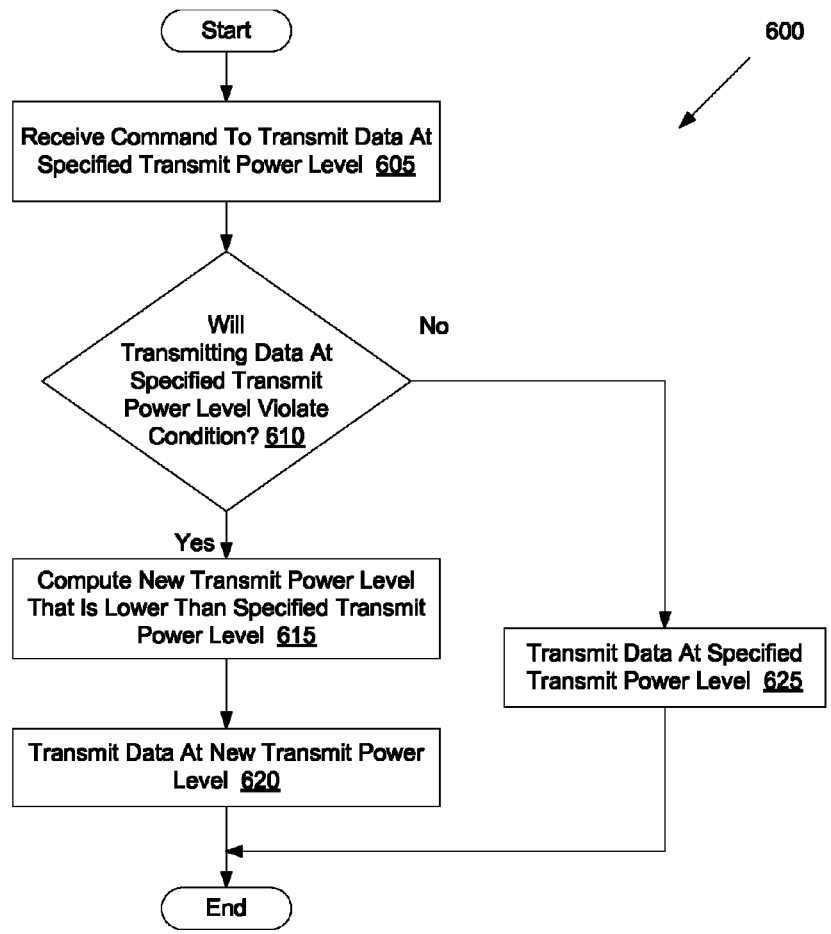
FIG. 6 is a flow diagram of an embodiment of a method for dynamically computing the transmit power level to use for data transmissions.

FIG. 6 is a flow diagram of one embodiment of a method for dynamically computing the transmit power level to use for data transmissions. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 6, at block 605 of method 600 a command to transmit data at a specified transmit power level is received by a user device. The command may be received from a wireless carrier, a WiFi hotspot, or other wireless communications system. Alternatively, the command may be received from an application running on the user device (e.g., an application for creating a wireless ad hoc network).

At block 610, the user device determines whether transmitting data at the specified transmit power level will cause the user device to violate one or more conditions. A condition may be a maximum accumulated power output level threshold condition, a communications interference condition, a transmission security condition, a human body part detection condition, or some other transmit power management condition. If transmitting data at the specified transmit power level will not cause the user device to violate the conditions, the method proceeds to block 625 and the data is transmitted at the specified transmit power level. If transmitting data at the specified transmit power level will cause the user device to violate the one or more conditions, the method proceeds to block 615.

At block 615, the user device determines a new transmit power level that is lower than the specified transmit power level. In one embodiment, the user device dynamically computes the new transmit power level based on a transmit power level algorithm. The transmit power level algorithm may include as inputs a moving sum of transmit power levels used over a sample period, a current signal to noise ratio, a proximity of a human body part to a transmission antenna, a prediction of future specified transmit power levels, whether there is additional data being transmitted via an alternative wireless connection/protocol, etc. In another embodiment, the violated condition specifies the new power output level to use. For example, for a wireless ad hoc network, a power output level that is sufficient to cause a transmission recipient at a predetermined distance to have a minimum required sensitivity (e.g., −50 dbm) may be set. The user device then transmits the data at the new transmit power level at block 620.

Figure 7:
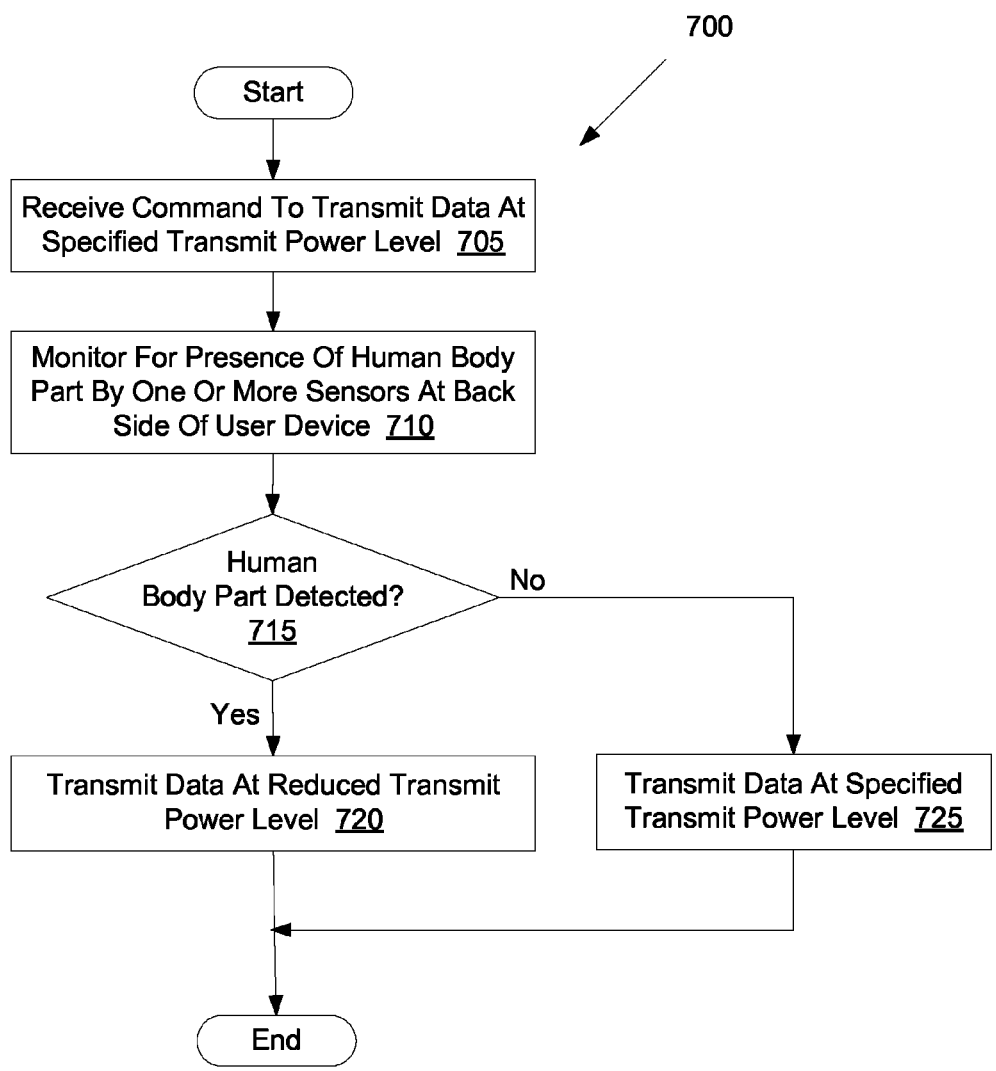
FIG. 7 is a flow diagram of an embodiment of a method for utilizing one or more sensors to determine when to reduce a transmit power level.

FIG. 7 is a flow diagram of one embodiment of a method 700 for utilizing one or more sensors to determine when to reduce a transmit power level. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 7, at block 705 of method 700 a command to transmit data at a specified transmit power level is received by a user device. At block 710, the user device monitors for the presence of a human body part by one or more sensors disposed at a back side of the user device. The user device may also monitor for the presence of a human body part by one or more sensors disposed at a front side of the user device.

At block 715, the user device determines whether a human body part has been detected on the back side (or front side) of the user device. In one embodiment, the user device determines whether the human body part has been detected within a predetermined distance from one or more antenna of the user device. If no human body part has been detected (or has been detected within the predetermined distance), the method proceeds to block 725 and the data is transmitted at the specified transmit power level. If a human body part has been detected within the predetermined distance, the method proceeds to block 720.

At block 720, the user device transmits the data at a reduced transmit power level. The user device may additionally receive a command to transmit additional data using a different antenna than was used to transmit the original data. Such transmission of the additional data via the additional antenna may also be at a reduced transmit power level. In one embodiment, the user device records transmit power levels used when a human body part is detected, and begins power throttling when it is determined that a user has been exposed to more than a specified amount of radiation (e.g., more than a maximum accumulated power output level).

Figure 8A:
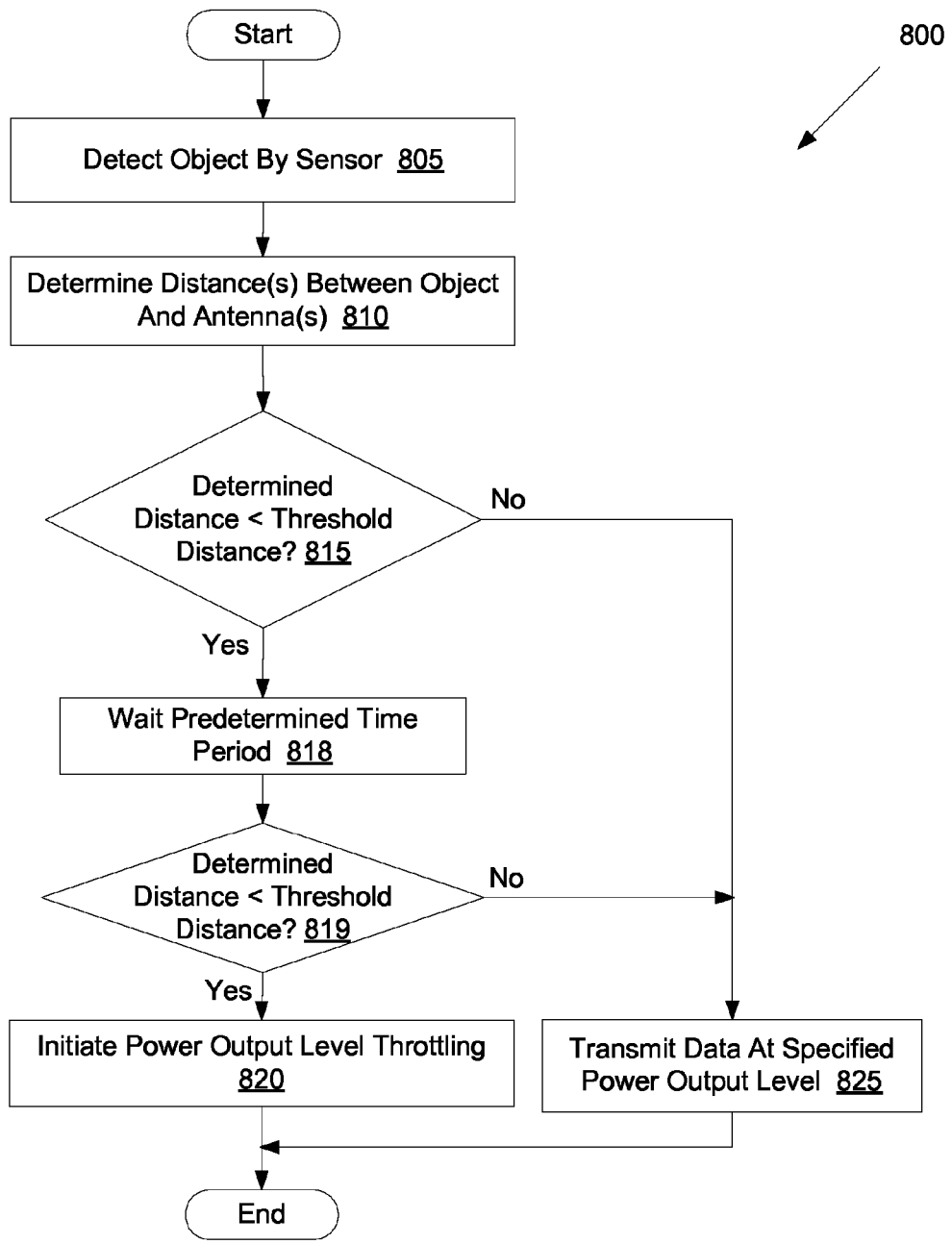
FIG. 8A is a flow diagram of another embodiment of a method for utilizing one or more sensors to determine when to reduce a transmit power level.

FIG. 8A is a flow diagram of another embodiment of a method 800 for utilizing one or more sensors to determine when to reduce a transmit power level. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 8A, at block 805 of method 800 a proximity sensor included in a user device detects an object. In one embodiment, an antenna operates as the proximity sensor. The object may be a portion of a human body. At block 810, the user device determines a distance between the detected object and one or more antennas of the user device. At block 815, the user device determines whether the object has been detected within a distance threshold (predetermined distance) from the one or more antennas of the user device. If the distance is outside the distance threshold, the method proceeds to block 825, and the data is transmitted by the one or more antennas at specified transmit power levels. If the distance is within the distance threshold, the method proceeds to block 818.

At block 818, the user device waits a predetermined time period. At the end of the predetermined time period, the method proceeds to block 819, and the user device again checks whether the distance is still within the threshold distance. If the distance is greater than the threshold distance, the method continues to block 825, and the data is transmitted at a specified transmit power level. If the distance is still less than the threshold distance, the method continues to block 820, and transmit power level throttling is initiated for data transmitted by the one or more antennas. In one embodiment, the transmit power level throttling is performed only for data transmitted by an antenna that is less than the threshold distance from the detected object. Alternatively, the transmit power level throttling is performed for data transmitted by all antennas. The same throttling algorithm may be used for each of the antennas, or different throttling algorithms may be used for different antennas. The method then ends.

Figure 8B:
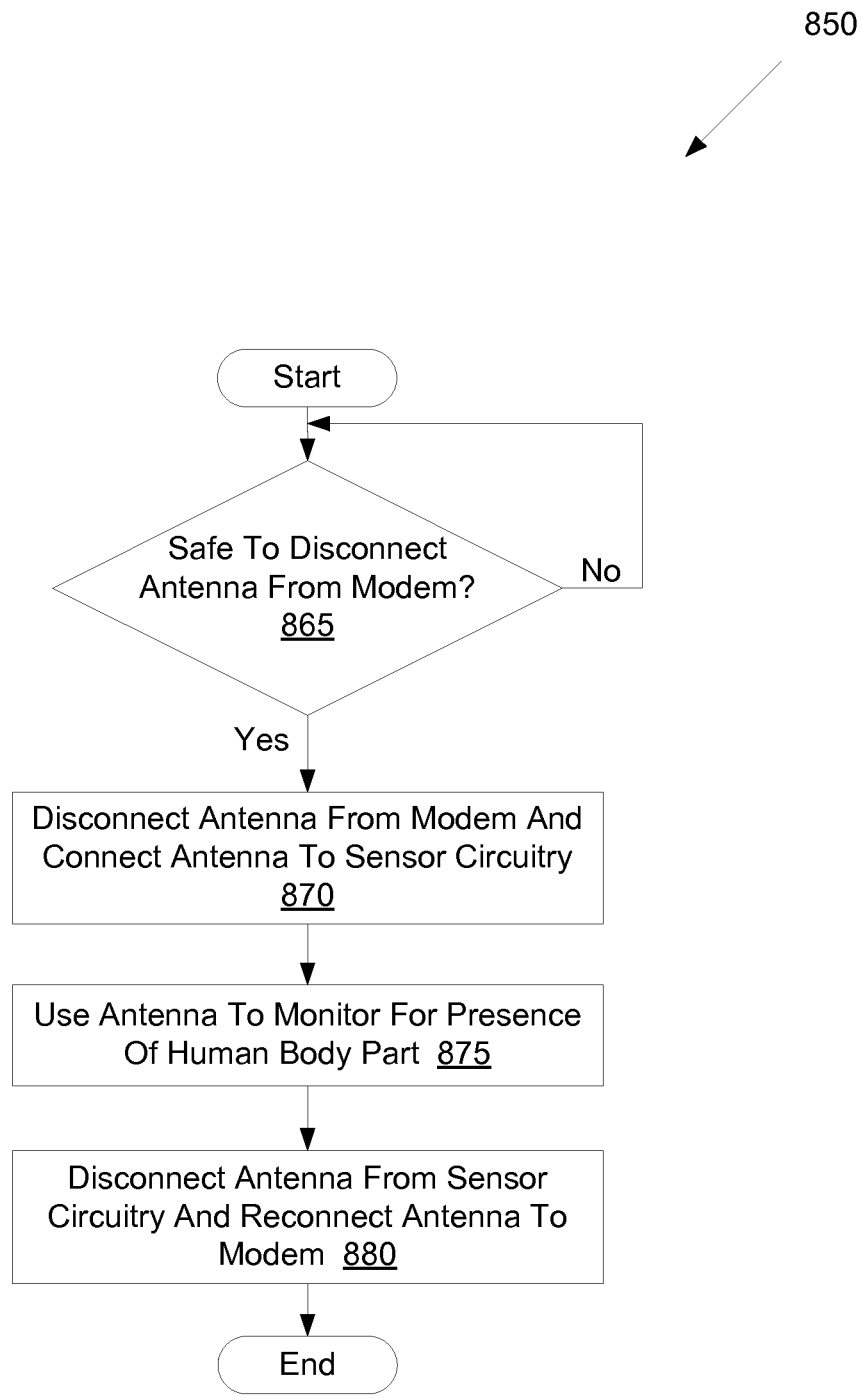
FIG. 8B is a flow diagram of one embodiment of a method for utilizing an antenna as a proximity sensor.

As mentioned with reference to FIG. 8A, in some embodiments an antenna may be used as a proximity sensor. FIG. 8B is a flow diagram of one embodiment of a method 850 for utilizing an antenna as a proximity sensor. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., user device 300 of FIG. 3).

Referring to FIG. 8B, at block 865, processing logic determines whether it is safe to disconnect an antenna from a wireless modem that sends and receives transmissions via the antenna. If it is safe to disconnect the antenna from the wireless modem, the method continues to block 870. This may be the case, for example, if processing logic determines that the antenna will not be or is unlikely to be needed to receive an incoming message or send an outgoing message within a predetermined time period (e.g., 100 ms or 50 ms). If it is not safe to disconnect the antenna from the modem, the method returns to block 865.

At block 870, processing logic causes a switch to disconnect the antenna from the modem and to connect the antenna to sensory circuitry. At block 875, the antenna is then used to monitor for the presence of a human body part. The antenna may monitor for the presence of a human body part for the predetermined time period. After the predetermined time period expires, the method continues to block 880, at which point processing logic causes the switch to disconnect the antenna from the sensor circuitry and reconnect the antenna to the wireless modem. The wireless modem can then resume sending and receiving transmissions.

Figure 9A:
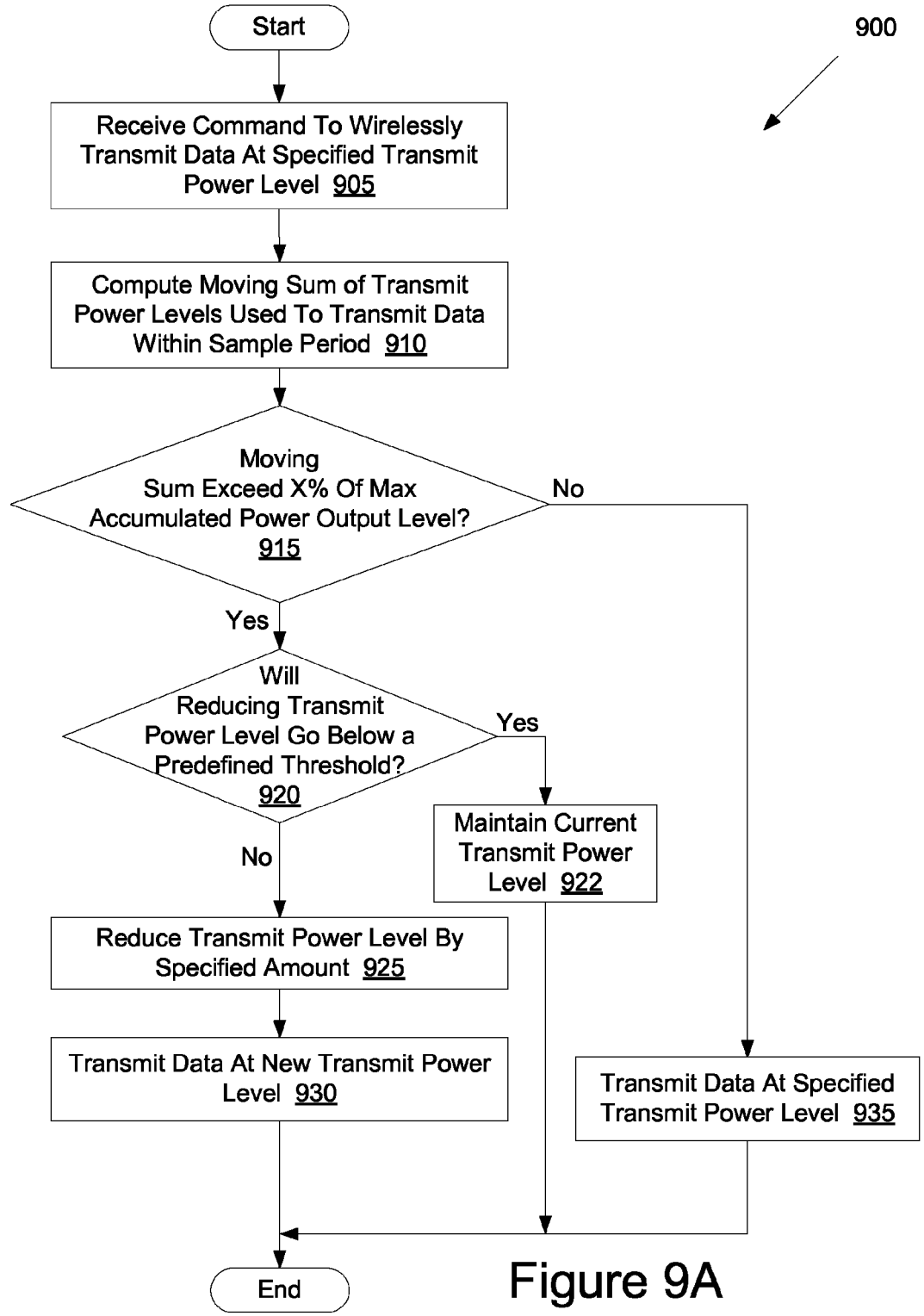
FIG. 9A is a flow diagram of another embodiment of a method for dynamically computing the transmit power level to use to transmit information.

FIG. 9A is a flow diagram of another embodiment of a method for dynamically computing the transmit power level to use for the transmission of information. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 9A, at block 905 of method 900 a command to wirelessly transmit information at a specified transmit power level is received by a user device. At block 910, the user device computes a moving sum of transmit power levels used to transmit information within a sample period. The moving sum may include the transmit power levels used to transmit information to multiple recipients and/or using multiple antennas/radios. For example, the moving sum may be a sum of the transmit power levels included in transmit power level log 250 and in transmit power level log 270. Alternatively, the moving sum may include the transmit power levels of only a single antenna (e.g., the sum of transmit power levels included in only transmit power level log 250). The moving sum may have a moving window (sample period) of the last 5 seconds, last 10 seconds, last minute, or some other interval.

At block 915, the user device determines whether the moving sum exceeds a predetermined percentage of a maximum accumulated power output level. The maximum accumulated power output level may be, for example, 1.6 W/kg. Alternatively, the maximum accumulated power output level may have other values. Those values may be set based on safety concerns (e.g., due to radiation that a user may absorb from radio transmissions). The predetermined percentage of the maximum safe accumulated output level may be 100%, 50%, 25%, or some other percentage.

Figure 10:
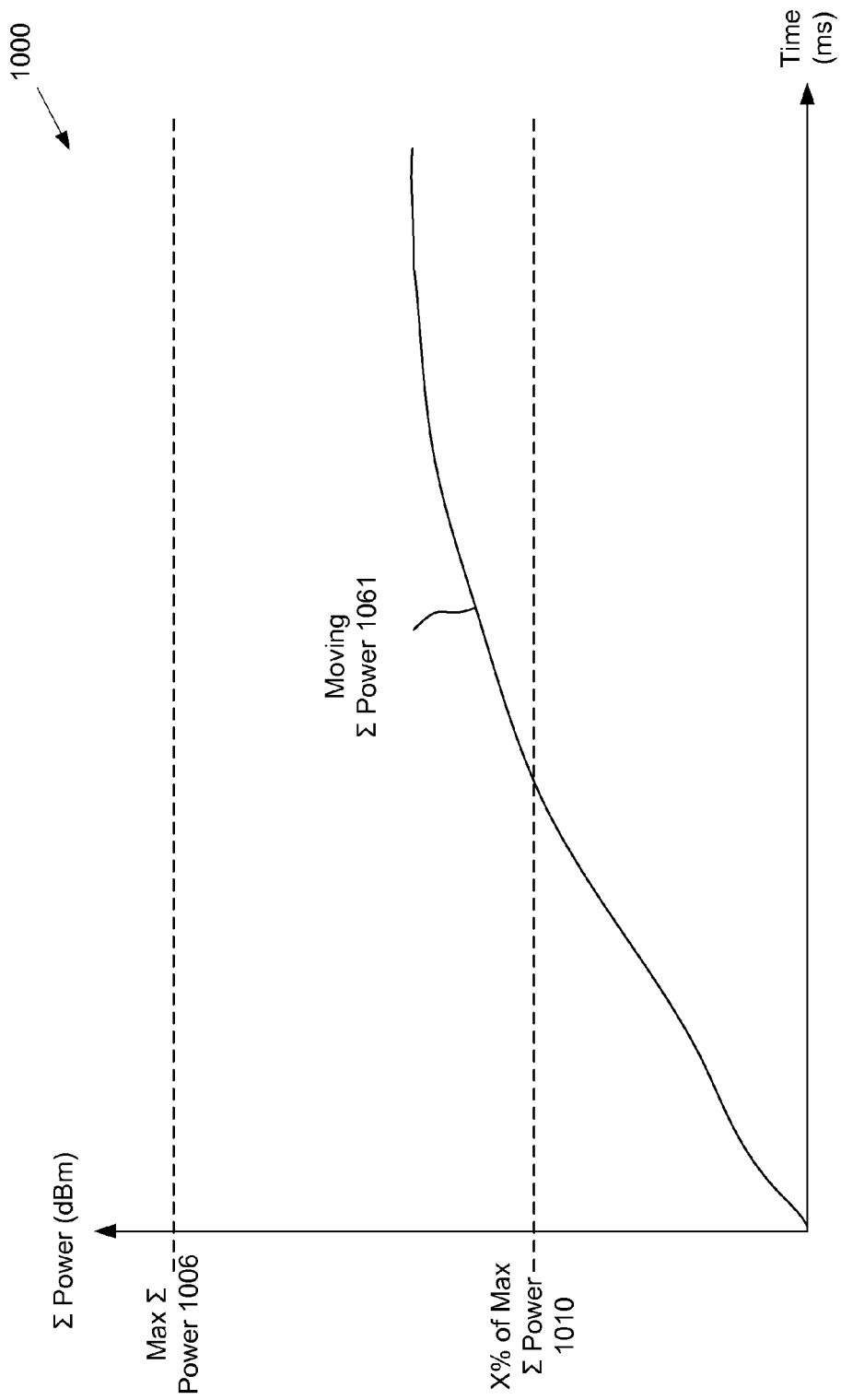
FIG. 10 illustrates a graph of time verses total (summed) transmit power, which shows a moving sum of transmit power levels.

An example of a moving sum of transmit power levels is shown in FIG. 10. FIG. 10 illustrates a graph 1000 of time verses total (summed) transmit power, which shows a moving sum 1061 of transmit power levels. The graph 1000 includes a maximum accumulated power output level (max Σ power) 1006 and a predetermined percentage of the maximum accumulated power output level (X % of max Σ power) 1010.

Referring back to FIG. 9A, if the predetermined percentage of the maximum accumulated power output level is exceeded, the method continues to block 920. Otherwise, the method continues to block 935, and information is transmitted at the specified transmit power level.

At block 920, the user device determines whether reducing the transmit power level below the specified transmit power level will cause the transmit power level to drop below a predefined lower threshold, which may cause the user device to lose a connection with a wireless communication system. If reducing the transmit power level will cause the transmit power level drop below the lower threshold, the method proceeds to block 922. If dropping the transmit power level will not cause the transmit power level to drop below the lower threshold, the method continues to block 925.

At block 922, the user device maintains a current transmit power level. The current transmit power level is the transmit power level that was previously used to transmit information. This may correspond to a previously specified transmit power level. Maintaining the current transmit power level may cause the moving sum of transmit power levels to level out at a value that is below the maximum accumulated power output level.

At block 925, the user device reduces the transmit power level by a specified amount. The lower the percentage of the maximum accumulated power output level, the less drastic the transmit power level reduction is likely to be. For example, if a transmit power management criterion specifies that the transmit power level should be throttled when the maximum accumulated power output level is reached, the transmit power level would likely be reduced significantly so as not to exceed the maximum accumulated power output level. On the other hand, if a transmit power management criterion specifies that the transmit power level should be throttled when 25% of the maximum accumulated power output level is reached, the transmit power level may be reduced marginally, and still cause the maximum accumulated power output level to not be exceeded.

In one embodiment, the user device reduces the transmit power level incrementally until a transmit power level that complies with one or more transmit power management conditions is reached. For example, the transmit power level may be reduced in 1 dbm increments until a transmit power level is reached that will cause the moving sum of transmit power levels to not exceed the maximum accumulated power output level. In another example, the transmit power level may be reduced in 0.5-2 dbm increments until a transmit power level is reached that will cause the moving sum of transmit power levels to trend towards a lower value (e.g., a value below the maximum safe accumulated power output level). At block 930, the user device then transmits information at the new transmit power level. The method then ends.

Figure 9B:
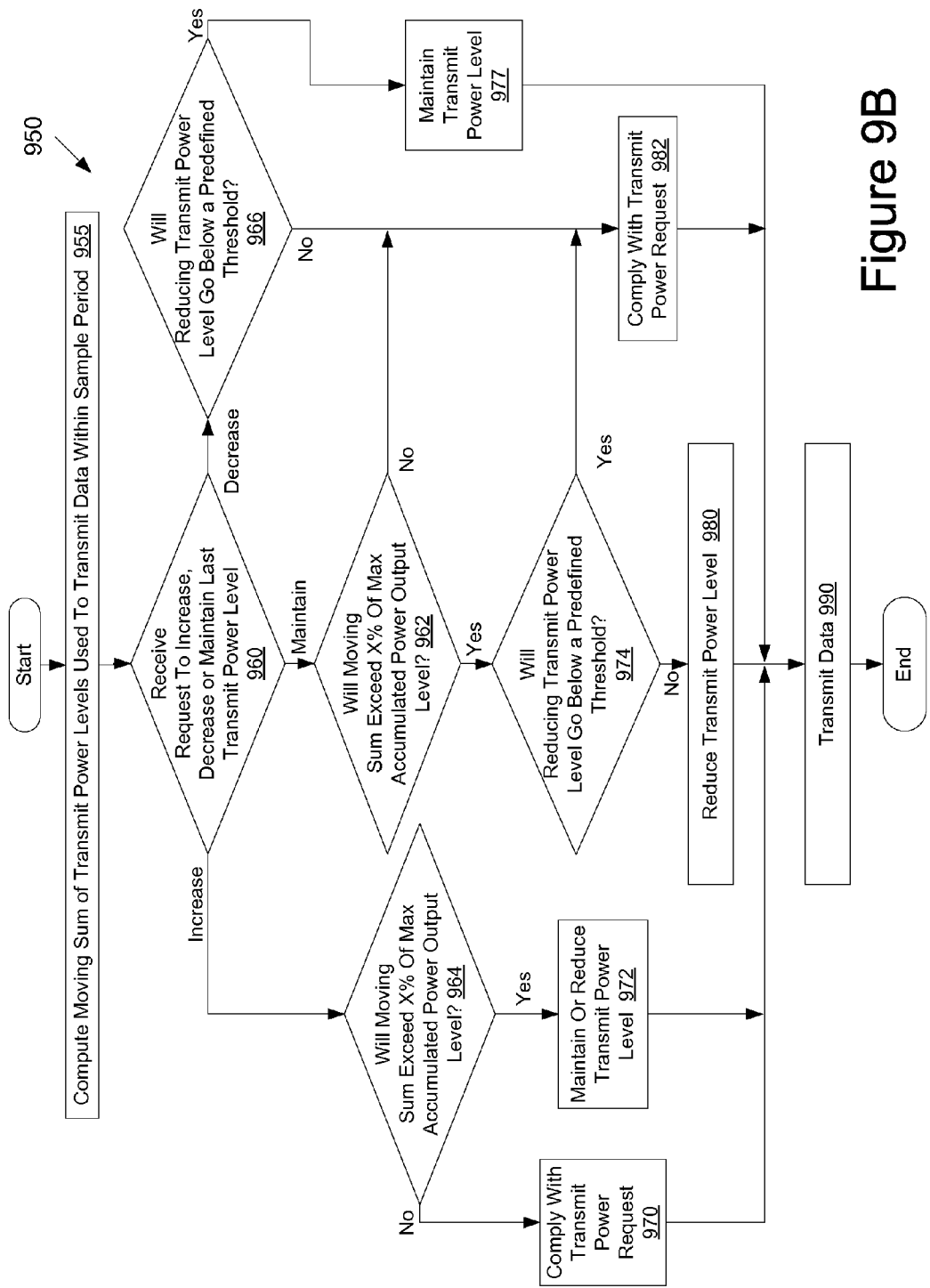
FIG. 9B is a flow diagram of yet another embodiment of a method for dynamically computing the transmit power level to use to transmit information.

FIG. 9B is a flow diagram of yet another embodiment of a method for dynamically computing the transmit power level to use for data transmissions. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 9B, at block 955 of method 950 a user device computes a moving sum of transmit power levels used to transmit data within a sample period. At block 960, the user device receives a specified transmit power level from a wireless communication system such as a wireless carrier. The specified transmit power may be received as a request to increase, decrease or maintain the last transmit power level used. If a request to decrease the transmit power level is received, the method continues to block 966. If a request to maintain the transmit power level is received, the method continues to block 962. If a request to increase the transmit power level is received, the method continues to block 964.

At block 966, the user device determines whether reducing the transmit power level will cause the transmit power level to fall below a predefined threshold. The threshold may be a static threshold or a moving threshold (e.g., a threshold that is based on an offset from the currently specified transmit power level). If reducing the transmit power level will cause the transmit power level to drop below the predefined threshold, the method continues to block 977, and the transmit power level is maintained. If reducing the transmit power level will not cause the transmit power level to drop below the predefined threshold, the method continues to block 982, and the request to decrease the transmit power level is complied with.

At block 962, the user device determines whether maintaining the transmit power level will cause the moving sum to exceed a predetermined percentage of a maximum accumulated power output level. If maintaining the transmit power level will not cause the moving sum to exceed the predetermined percentage of the maximum accumulated power output level, the method continues to block 982, and the request to maintain the transmit power level is complied with. If maintaining the transmit power level will cause the moving sum to exceed the predetermined percentage of the maximum accumulated power output level, the method continues to block 974.

At block 974, the user device determines whether reducing the transmit power level will cause the transmit power level to drop below a predefined threshold. The threshold may be a static threshold or a moving threshold (e.g., a threshold that is based on an offset from the currently specified transmit power level). If reducing the transmit power level will cause it to drop below a lower threshold, the method continues to block 982, and the request to maintain the transmit power level is complied with. Otherwise, the method proceeds to block 980, and the transmit power level is reduced.

At block 964, the user device determines whether increasing the transmit power level will cause the moving sum to exceed the predetermined percentage of the maximum accumulated power output level. If increasing the transmit power level will cause the predetermined percentage to be exceeded, the method continues to block 972. Otherwise, the method continues to block 970 and the user device complies with the request to increase the transmit power level.

At block 972, the user device either maintains or reduces the transmit power level. By maintaining the transmit power level rather than increasing it, the user device may cause the moving sum to level out before it exceeds the predetermined percentage of the maximum accumulated power output level. By reducing the transmit power level, the user device may cause the moving sum to decrease. If it is determined that maintaining the transmit power level will not be sufficient to prevent the moving sum from exceeding the predetermined percentage of the maximum accumulated power output level, the user device may determine whether reducing the transmit power level will cause it to drop below a predefined lower threshold before reducing the transmit power level, as is described with reference to block 974.

Note that there is a risk that the user device will lose a connection whether it chooses to maintain or reduce the transmit power level at block 972. Similarly, there is a risk that the connection will be lost at block 980 when the transmit power level is reduced. However, the transmit power level may be reduced or maintained in spite of that risk, for example, to reduce the radiation exposure of a user.

At block 990, the user device transmits data at the power level that was determined. Method 950 may repeat until the user device no longer has any active wireless connections.

Figure 11:
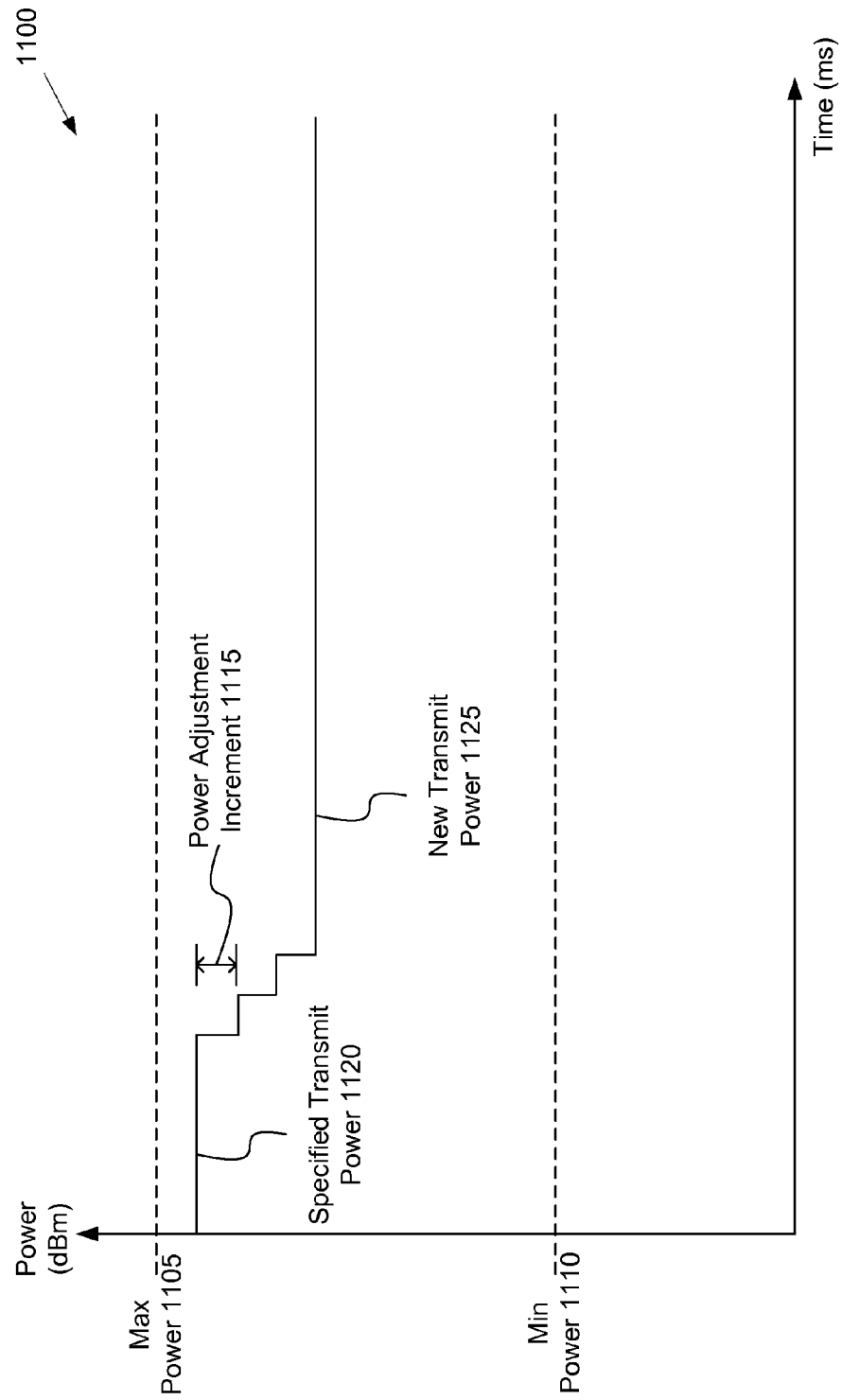
FIG. 11 is a chart showing power adjustments made to a transmit power level.

FIG. 11 is a chart 1100 showing power adjustments made to a transmit power level. As shown, initially a specified transmit power level 1120 is used. Then at some point a transmit power level management condition may be violated, which may cause the transmit power level to be throttled down. Multiple incremental power adjustments are made at power adjustment increment 1115. The transmit power level has been incrementally reduced (e.g., in three increments as shown) until a new transmit power 1125 was reached that does not cause the transmit power management condition to be violated. The chart 1100 shows a maximum power 1105 and a minimum power 1110. In one embodiment, a current transmit power level cannot exceed the maximum transmit power 1105 or drop below the minimum transmit power 1110.

Figure 12:
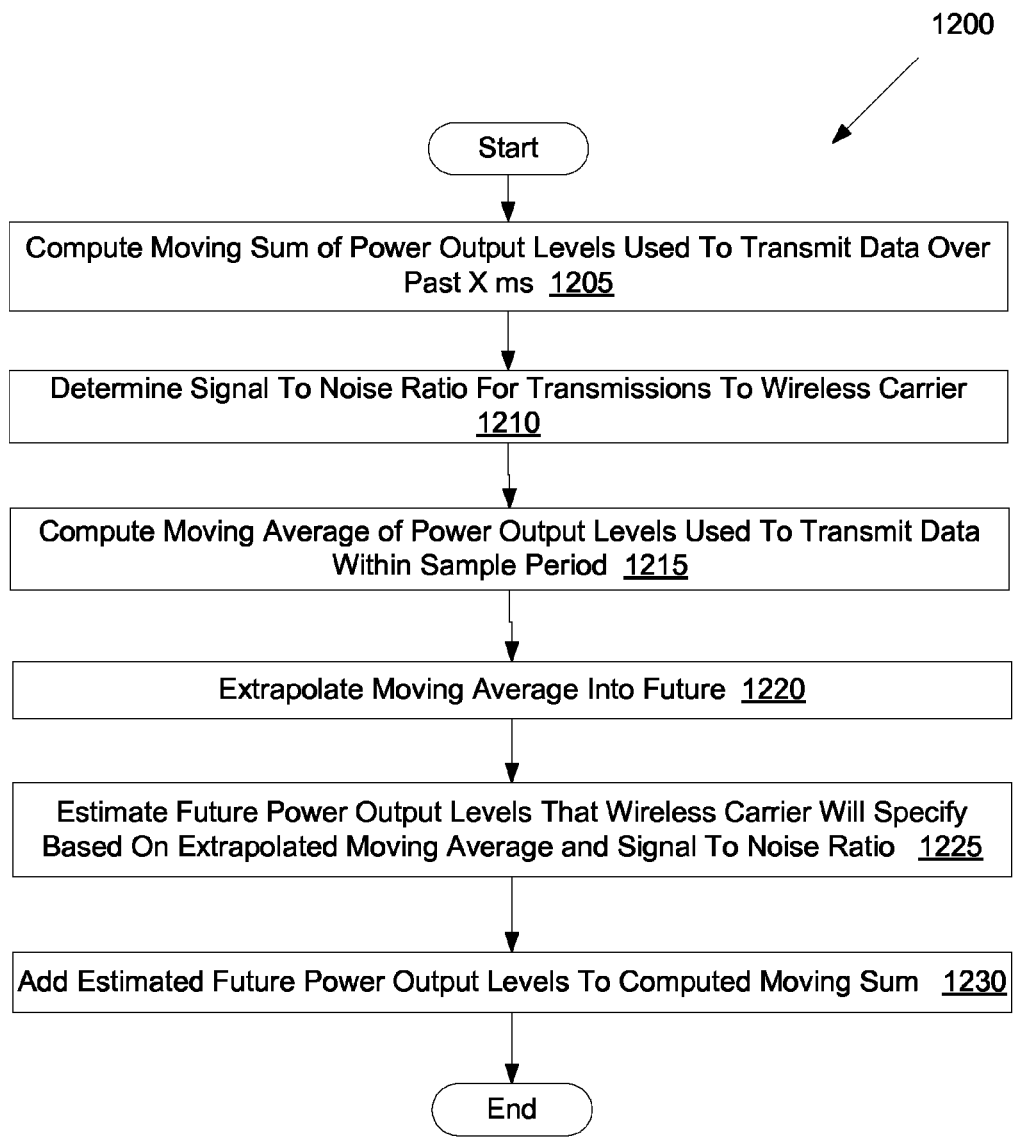
FIG. 12 is a flow diagram of one embodiment of a method for computing a moving sum of transmit power levels.

FIG. 12 is a flow diagram of one embodiment of a method for computing a moving sum of transmit power levels. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 12, at block 1205 of method 1200 a moving sum of transmit power levels used to transmit data over a predetermined sample period is computed (e.g., as shown in FIG. 10). This moving sum may be generated from one or more transmit power level logs (e.g., transmit power level log 250 and/or 270). At block 1210, the user device determines a signal to noise ratio for transmissions to a wireless carrier. At block 1215, the user device computes a moving average of transmit power levels used to transmit data within a sample period. The sample period may be the same sample period used to generate the moving sum, or may be a different sample period. The moving average may be computed from one or more transmit power level logs (e.g., transmit power level log 250 and/or 270).

Figure 13:
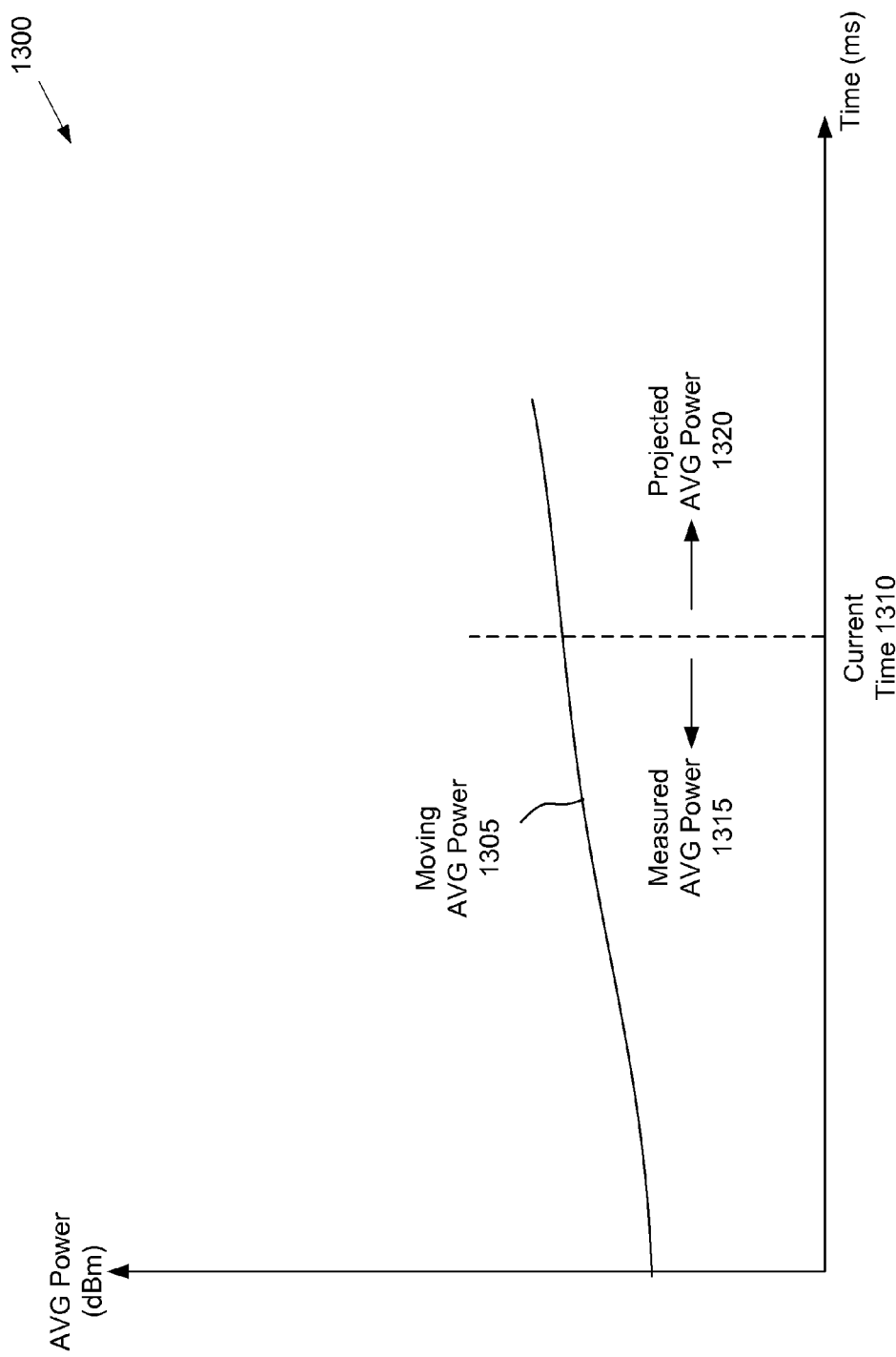
FIG. 13 illustrates a chart showing a moving average of transmit power levels.

At block 1220, the user device extrapolates the moving average into the future. This extrapolation may be based on a curve fitting function, a linear function, a polynomial function, or some other function. In one embodiment, the user device extrapolates the moving average 5-10 ms into the future. Alternatively, the user device may extrapolate the moving average 1 second, 5 seconds, or some other time span into the future. FIG. 13 illustrates a chart 1300 showing a moving average 1305 of transmit power levels. The chart 1300 shows measured average transmit powers 1315 up to the current time 1310. The chart further shows projected average transmit powers 1320 for the future.

Returning to FIG. 12, at block 1225, the user device estimates future transmit power levels that the wireless carrier will specify based on the extrapolated moving average and the signal to noise ratio. The user device can then apply the estimated future transmit power levels for a number of estimated future transmissions. Such estimated transmissions may be based on information regarding how much data the user device needs to transmit and/or a desired data rate for the transmissions. At block 1230, the user device adds the estimated future transmit power levels to the computed moving sum. This value may then be used to determine whether a condition has been or will be violated.

Figure 14:
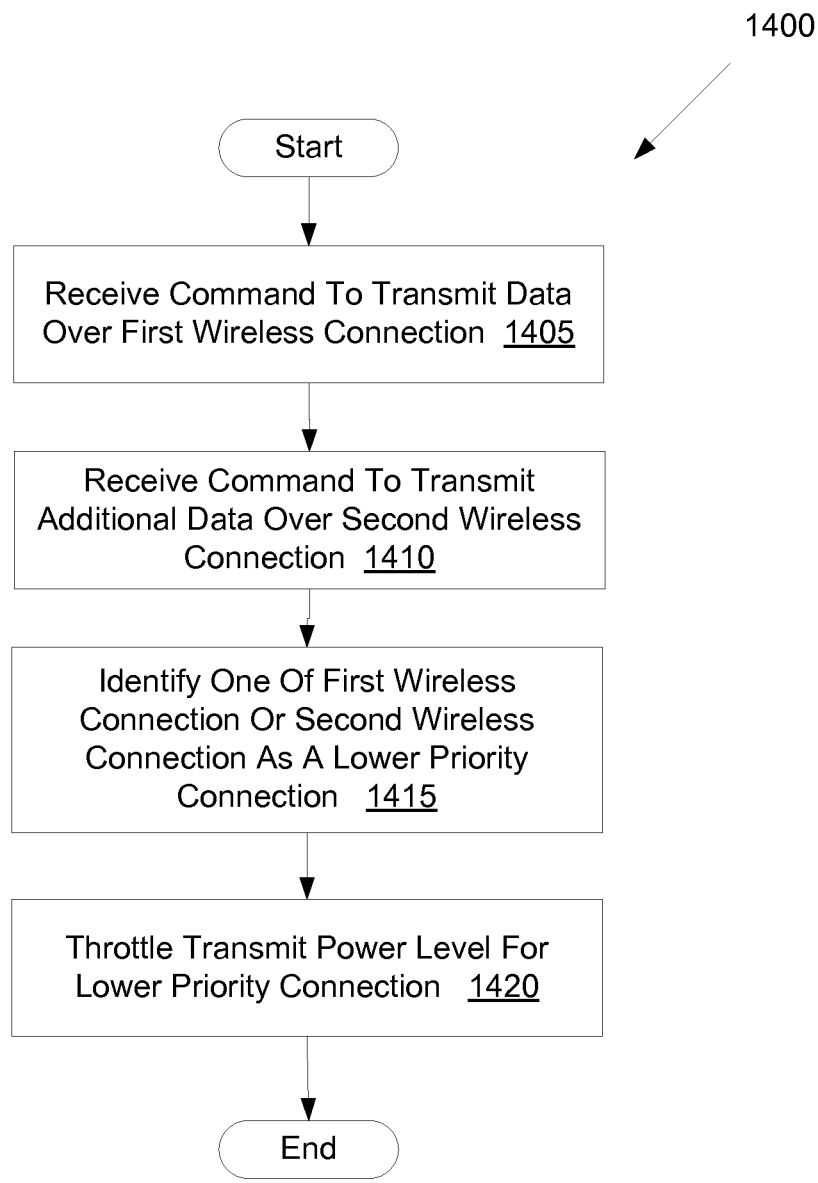
FIG. 14 is a flow diagram of an embodiment of a method for reducing interference between antennas of a user device.

FIG. 14 is a flow diagram of one embodiment of a method for reducing interference between wireless connections of a user device. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 14, at block 1405 of method 1400 a user device receives a command to transmit data over a first wireless connection. The first wireless connection may be a connection using Wi-Fi, GSM, CDMA, WCDMA, TDMA, UMTS, LTE or some other type of wireless connection. At block 1410, the user device receives a command to transmit additional data over a second wireless connection. The second wireless connection uses a different wireless communication protocol than the first wireless connection, which may include Wi-Fi, GSM, CDMA, WCDMA, TDMA, UMTS, LTE or some other type of wireless connection. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WiFi hotspot and a connection to a wireless carrier system. In one embodiment, the first wireless connection is associated with a first antenna and the second wireless connection is associated with a second wireless antenna.

At block 1415, the user device identifies one of the first wireless connection or the second wireless connection as a lower priority connection. For example, the first wireless connection may be a WiFi connection and the second wireless connection may be a GSM connection with a wireless carrier. In such an instance, the WiFi connection may be identified as a lower priority connection, while the GSM connection may be identified as a higher priority connection. At block 1420, the user device throttles down transmit power level for the lower priority connection. By throttling down the transmit power level of the lower priority connection, any interference that the lower priority connection causes to the higher priority connection will be minimized or eliminated. Thus, a connection quality of the higher priority connection can be maintained even when multiple wireless connections are being used.

Figure 15:
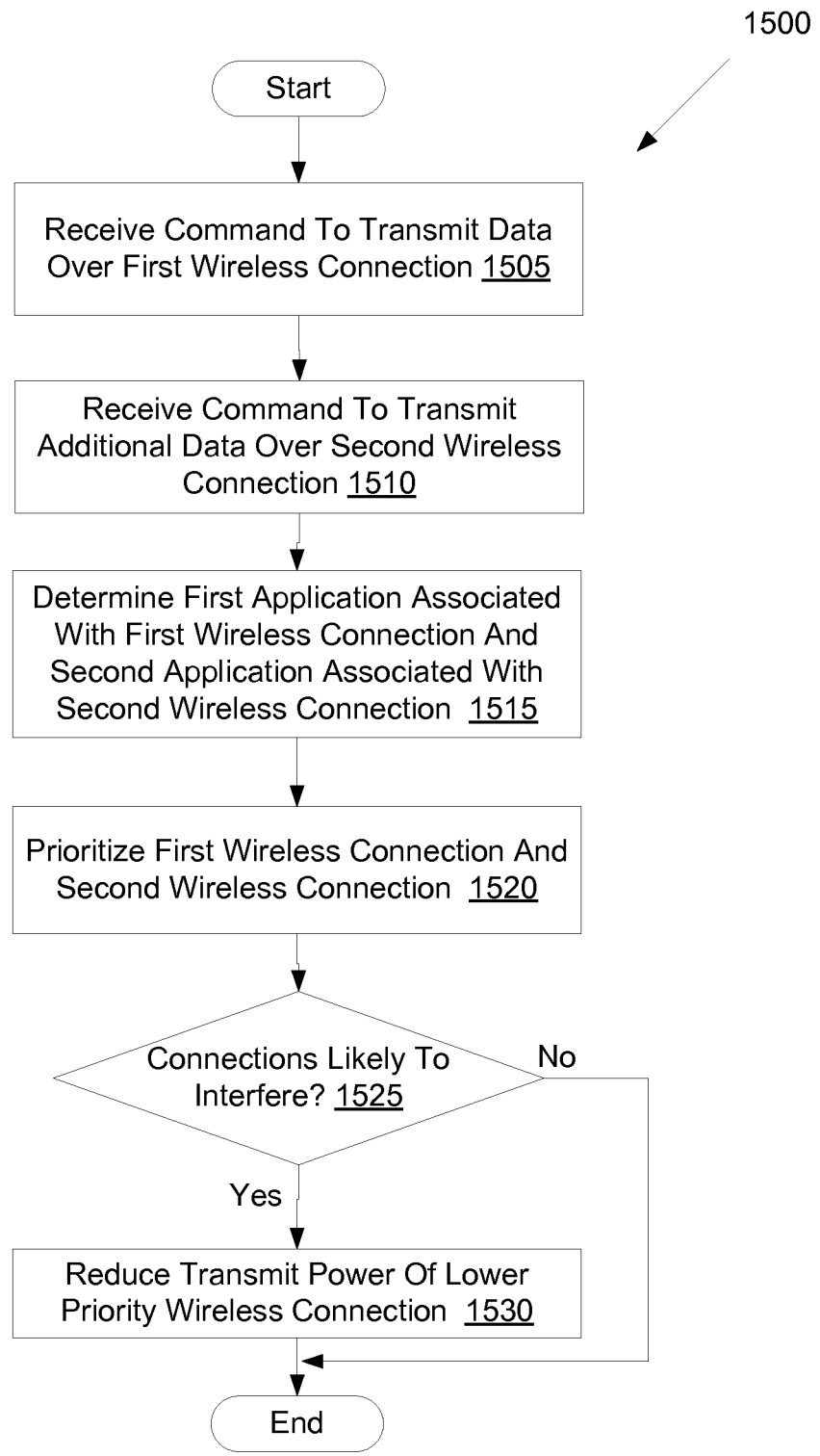
FIG. 15 is a flow diagram of another embodiment of a method for reducing interference between antennas of a user device.

FIG. 15 is a flow diagram of another embodiment of a method for reducing interference between wireless connections of a user device. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 15, at block 1505 of method 1500 a user device receives a command to transmit data over a first wireless connection. At block 1510, the user device receives a command to transmit additional data over a second wireless connection, which uses a different wireless communication protocol than the first wireless connection.

At block 1515, the user device determines a first application associated with the first wireless connection and a second application associated with the second wireless connection.

For example, the first wireless connection may be connected with a media purchase application (e.g., for downloading electronic books), while the second wireless connection may be associated with a wireless ad hoc network application. Other applications that may be associated with one of the wireless connections include, for example, a game, a telephony application, an internet browsing application, and so forth. At block 1515, the user device may further identify current operations of the first and/or second application. For example, a file transfer operation may be active on the wireless ad hoc network application, or a download operation may be active on the media purchase application.

At block 1520, the user device prioritizes the wireless connections based on the applications associated with the two wireless connections and/or based on the active operations of the applications. For example, a wireless connection associated with a media purchase application and/or a downloading operation (e.g., an eBook downloading operation) may be given higher priority than a wireless connection associated with a wireless ad hoc network application and/or a file transfer operation. Alternatively, the user device may prioritize the wireless connections based on other criteria. For example, the user device may prioritize the wireless connections based on a third party that the user device connects with via the connections (e.g., connections to a wireless carrier may be prioritized higher than connections to other user devices). In another example, connections may be prioritized based on communications protocols used for the different connections (e.g., WiFi connections may be prioritized lower than other connections).

At block 1525, the user device determines whether the two wireless connections are likely to interfere with one another. If the wireless connections are likely to interfere, the method continues to block 1530, and the transmit power level of the lower priority wireless connection is reduced. Otherwise, the method ends.

Figure 16:
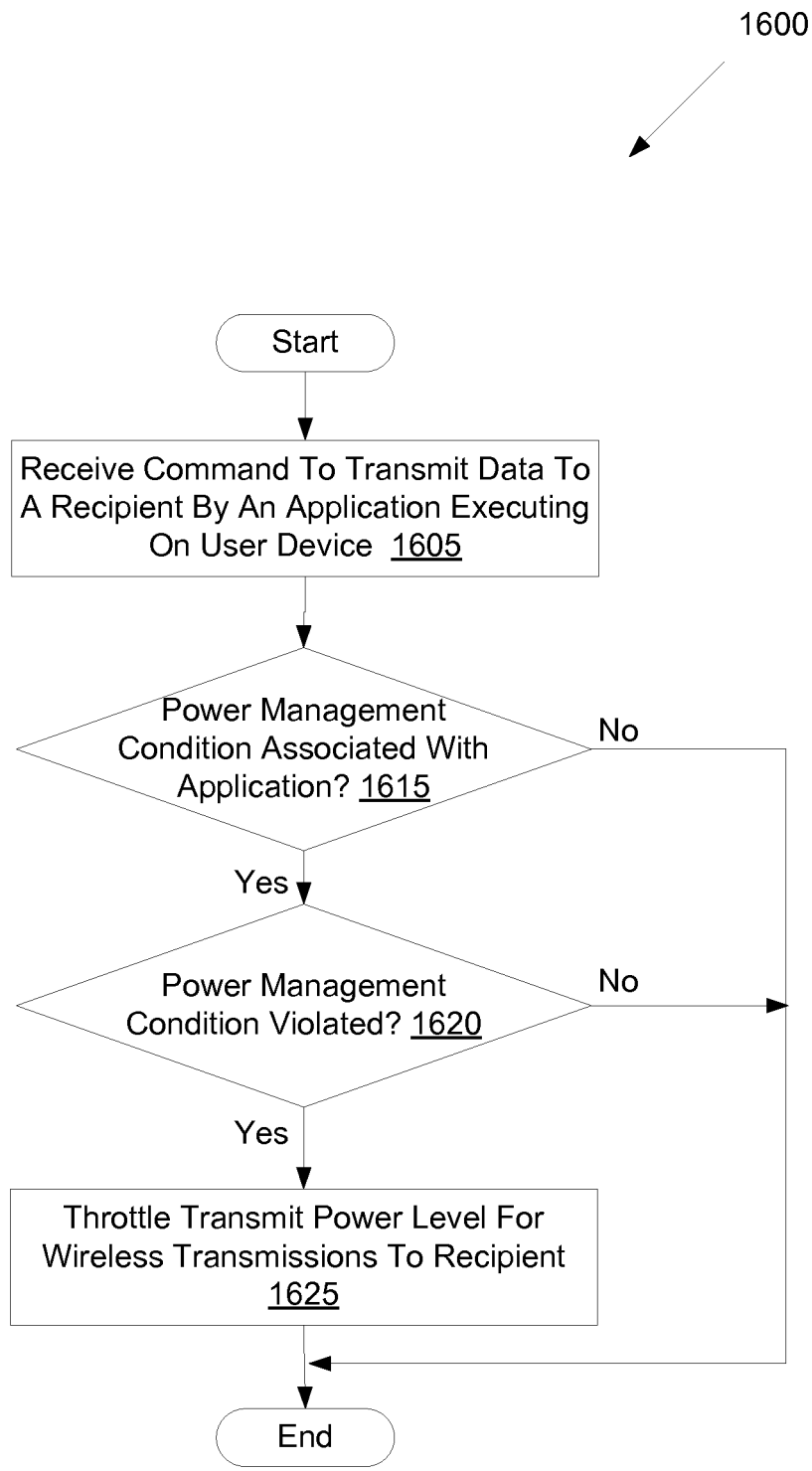
FIG. 16 is a flow diagram of an embodiment of a method for reducing a power output level of an antenna based on an associated application and/or operation.

FIG. 16 is a flow diagram of one embodiment of a method for reducing a power output level of an antenna based on an associated application and/or operation. The method is performed by processing logic that may comprise hardware (circuitry, dedicated logic, etc.), software (such as is run on a general purpose computer system or a dedicated machine), or a combination of both. In one embodiment, embodiments of the method are performed by a user device (e.g., a power manager 135 of user device 104 of FIG. 1).

Referring to FIG. 16, at block 1605 of method 1600 a user device receives a command to transmit data to a recipient. The command is received from an application running on the user device, such as a wireless ad hoc network application. At block 1615, the user device determines whether there are any transmit power level management conditions (also referred to herein as power management conditions) associated with the application and/or with a current operation of the application. If there are any power management conditions associated with the application (or operation), the method continues to block 1620. Otherwise the method ends. An example of a power management condition that may be associated with an application is a security power management condition. A security power management condition may specify a power output level to use for the condition to ensure that only devices within a predetermined range from the user device can receive transmissions of the user device. Such a power management condition may apply, for example, to a wireless ad hoc network application during a file transfer operation. Therefore, only the peer to which the user device is meant to connect can receive the user device's transmissions.

At block 1620, the user device determines whether any of the associated power management conditions are violated. If any power management conditions are violated, the method continues to block 1625, and the transmit power level for wireless transmissions to the recipient are throttled. The amount that the wireless transmissions are throttled may be specified in the power management condition. In one embodiment, the management condition specifies a single transmit power level. Alternatively, the condition may include multiple transmit power levels. A decision of which transmit power level to use may be based on, for example, a current operation of the active application, or some other criteria. In one embodiment, a power management condition includes a low, medium and high transmit power level, each of which may be used under different circumstances (e.g., based on a distance between the user device and an additional user device). Alternatively, a transmit power level may be determined independent of the power management condition that was violated.

In one embodiment, when a power level is throttled, the user device instructs a user to move the user device to within a predetermined distance of another user device with which the ad hoc network will be established. Once within this distance, the devices may communicate using the throttled power level. A user may be directed to bring the user devices closer to one another until a required sensitivity is reached. If the required sensitivity is not obtained within a predetermined time period, the wireless radio of the user device may be shut off.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "transmitting", "receiving", "throttling", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a user device, a command to wirelessly transmit information to a wireless communication system at a transmit power level specified by the wireless communication system;
   computing, by the user device, a moving sum of transmit power levels used to transmit previous information within a moving window, wherein the moving sum of the transmit power levels is a summed total of the transmit power levels used within the moving window, and wherein the moving window spans a time period extending backward in time from a current time at which the moving sum is computed to a previous time that is a specified temporal distance from the current time;
   determining, by the user device, whether transmitting the information at the specified transmit power level using a first duty cycle will cause the moving sum to exceed a predetermined percentage of a maximum accumulated power level, wherein the predetermined percentage is less than 100% of the maximum accumulated power level, the maximum accumulated power level representing a maximum amount of radiation that the user device will expose a user to in a specified time period, wherein the first duty cycle comprises a first ratio of active periods during which the user device is to transmit data to inactive periods during which the user device is not to transmit data;
   responsive to determining that transmitting the information at the specified transmit power level using the first duty cycle will cause the moving sum to exceed the predetermined percentage of the maximum accumulated power level, performing the following comprising:
      determining a new duty cycle that is lower than the first duty cycle, wherein the new duty cycle comprises a second ratio of the active periods during which the user device is to transmit data to the inactive periods during which the user device is not to transmit data, and wherein the second ratio is lower than the first ratio; and
      transmitting the information using the new duty cycle
   detecting whether a portion of a user's body is within a predetermined distance from an antenna of the user device; and
   determining whether transmitting the information at the specified transmit power level using the first duty cycle will cause the moving sum to exceed the predetermined percentage of the maximum accumulated power level when the portion of the user's body is detected.

2. The method of claim 1, further comprising
   responsive to determining that transmitting the information at the specified transmit power level using the first duty cycle will cause the moving sum to exceed the predetermined percentage of the maximum accumulated power level, computing a new transmit power level that is lower than the specified transmit power level, wherein the information is transmitted at the new transmit power level using the new duty cycle.

3. A user device comprising:
   a memory;
   a processor, coupled to the memory, to:
      receive a command to transmit information at a specified transmit power level;
      compute a moving sum of transmit power levels used to transmit previous information within a moving window, wherein the moving sum of the transmit power levels is a summed total of the transmit power levels used within the moving window, and wherein the moving window spans a time period extending backward in time from a current time at which the moving sum is computed to a previous time that is a specified temporal distance from the current time;
      determine whether transmitting the information at the specified transmit power level using a first duty cycle will cause the moving sum to exceed a predetermined percentage of a maximum accumulated power level, wherein the predetermined percentage is less than 100% of the maximum accumulated power level; and
      determine a new duty cycle that is lower than the first duty cycle responsive to a determination that transmitting the information at the specified transmit power level using the first duty cycle will cause the moving sum to exceed the predetermined percentage of the maximum accumulated power level;
      detect whether a portion of a user's body is within a predetermined distance from an antenna of the user device; and
      determine whether transmitting the information at the specified transmit power level using the first duty cycle will cause the moving sum to exceed the predetermined percentage of the maximum accumulated power level within a specified time period when the portion of the user's body is detected; and
   an antenna, coupled to the processor, to transmit the information using the new duty cycle.

4. The user device of claim 3, wherein the first duty cycle comprises a first ratio of active periods during which the user device is to transmit data to inactive periods during which the user device is not to transmit data, and wherein the new duty cycle comprises a second ratio of the active periods during which the user device is to transmit data to the inactive periods during which the user device is not to transmit data, the second ratio being lower than the first ratio.

5. The user device of claim 3, wherein the specified transmit power level is specified by a wireless carrier.

6. The user device of claim 3, wherein the processor is further to:
   estimate one or more future transmit power levels that a wireless communication system will specify for information to be transmitted in the future; and
   determine the new duty cycle based at least in part on the moving sum and on the estimated one or more future transmit power levels.

7. The user device of claim 3, wherein the maximum accumulated power level is based on an amount of radiation absorbed by a user.

8. The user device of claim 3, wherein the processor is further to
   responsive to determining that transmitting the information at the specified transmit power level using the first duty cycle will cause the moving sum to exceed the predetermined percentage of the maximum accumulated power level, compute a new transmit power level that is lower than the specified transmit power level, wherein the information is transmitted at the new transmit power level using the new duty cycle.

9. The user device of claim 8, wherein the processor is further to
   incrementally reduce the new transmit power level from the specified transmit power level until the new transmit power level will not cause the moving sum to exceed the predetermined percentage of the maximum accumulated power level.

10. A non-transitory computer readable medium including instructions that, when executed by a processor of a user device, cause the processor to perform operations comprising:
    receiving, by the processor, a command to transmit information at a specified transmit power level;
    computing, by the processor, a moving sum of transmit power levels used to transmit previous information within a moving window, wherein the moving sum of the transmit power levels is a summed total of the transmit power levels used within the moving window, and wherein the moving window spans a time period extending backward in time from a current time at which the moving sum is computed to a previous time that is a specified temporal distance from the current time;
    determining, by the processor, whether transmitting the information at the specified transmit power level using a first duty cycle will cause the moving sum to exceed a predetermined percentage of a maximum accumulated power level, wherein the predetermined percentage is less than 100% of the maximum accumulated power level;
    responsive to determining that transmitting the information at the specified transmit power level using the first duty cycle will cause the moving sum to exceed the predetermined percentage of the maximum accumulated power level, determining a new duty cycle that is lower than the first duty cycle, and transmitting the information using the new duty cycle;
    detecting whether a portion of a user's body is within a predetermined distance from an antenna of the user device; and
    determining whether transmitting the information at the specified transmit power level using the first duty cycle will cause the moving sum to exceed the predetermined percentage of the maximum accumulated power level when the portion of the user's body is detected.

11. The computer readable medium of claim 10, the operations further comprising:
    estimating one or more future transmit power levels that a wireless communication system will specify for information to be transmitted in the future; and
    determining the new duty cycle based at least in part on the moving sum and on the estimated one or more future transmit power levels.

12. The computer readable medium of claim 10, wherein the maximum accumulated power level is based on an amount of radiation absorbed by a user.

13. The computer readable medium of claim 10, the operations further comprising
    responsive to determining that transmitting the information at the specified transmit power level using the first duty cycle will cause the moving sum to exceed the predetermined percentage of the maximum accumulated power level, computing a new transmit power level that is lower than the specified transmit power level, wherein the information is transmitted at the new transmit power level using the new duty cycle.

14. The computer readable medium of claim 10, wherein the first duty cycle comprises a first ratio of active periods during which the user device is to transmit data to inactive periods during which the user device is not to transmit data, and wherein the new duty cycle comprises a second ratio of the active periods during which the user device is to transmit data to the inactive periods during which the user device is not to transmit data, the second ratio being lower than the first ratio.

* * * * *